United States Patent
Larson et al.

(10) Patent No.: US 10,863,795 B2
(45) Date of Patent: Dec. 15, 2020

(54) ARTICLES OF FOOTWEAR WITH PRINTED MATERIAL DEPOSITED THEREON

(71) Applicant: NIKE, Inc., Beaverton, OR (US)

(72) Inventors: Ryan R. Larson, Portland, OR (US); Todd W. Miller, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 15/993,106

(22) Filed: May 30, 2018

(65) Prior Publication Data

US 2019/0365047 A1 Dec. 5, 2019

(51) Int. Cl.
*A43B 23/02* (2006.01)
*B33Y 80/00* (2015.01)
(Continued)

(52) U.S. Cl.
CPC ........ *A43B 23/0265* (2013.01); *A43B 3/0078* (2013.01); *A43B 23/026* (2013.01); *A43B 23/027* (2013.01); *A43B 23/0215* (2013.01); *A43B 23/0235* (2013.01); *A43B 23/0275* (2013.01); *B29D 35/146* (2013.01); *B33Y 80/00* (2014.12); *B29K 2995/007* (2013.01); *B33Y 10/00* (2014.12)

(58) Field of Classification Search
CPC .............. A43B 23/0265; A43B 23/026; A43B 23/0215; A43B 23/0235; A43B 23/024; A43B 23/0225; A43B 23/027; A43B 23/0275; A43B 23/0295; A43B 3/0078; A43B 3/0036; A43B 1/0027; B29D 35/146; B33Y 80/00; B33Y 10/00; B29K 2995/007

USPC .............................................. 36/98
See application file for complete search history.

(56) References Cited

U.S. PATENT DOCUMENTS

| | | | |
|---|---|---|---|
| 2,001,962 A | * | 5/1935 | Kantrow .............. A43B 3/0078 428/48 |
| 6,612,824 B2 | | 9/2003 | Tochimoto et al. |

(Continued)

FOREIGN PATENT DOCUMENTS

| | | |
|---|---|---|
| CN | 103126182 A | 6/2013 |
| CN | 204451221 U | 7/2015 |

(Continued)

OTHER PUBLICATIONS

First Office Action mailed in Taiwan Patent Application No. 108115335, dated Jan. 30, 2020, with English translation (16 pages).
(Continued)

Primary Examiner — Sharon M Prange
Assistant Examiner — Grace Huang
(74) Attorney, Agent, or Firm — Klarquist Sparkman, LLP

(57) ABSTRACT

An article of footwear can include a sole structure, an upper, and a printed layer. The upper can be coupled to the sole structure. The printed layer can be disposed on the upper and include a first printed material and a second printed material. The first printed material can have a plurality of spaced-apart first segments and have a first hardness. The second printed material can have a plurality of spaced-apart second segments and have a second hardness that is less than the first hardness of the first printed material. Each of the second segments can be disposed adjacent to one or more of the first segments.

19 Claims, 16 Drawing Sheets

(51) Int. Cl.
  B29D 35/14 (2010.01)
  A43B 3/00 (2006.01)
  B33Y 10/00 (2015.01)

(56) References Cited

U.S. PATENT DOCUMENTS

| | | | |
|---|---|---|---|
| 6,852,399 B2* | 2/2005 | Takahashi | B32B 37/144 |
| | | | 428/189 |
| 6,964,807 B2* | 11/2005 | Nakashima | B32B 27/04 |
| | | | 106/31.19 |
| 8,142,860 B2 | 3/2012 | Vanmaele et al. | |
| 8,424,116 B2* | 4/2013 | Anastsopoulos | A41B 11/003 |
| | | | 2/239 |
| 8,993,061 B2 | 3/2015 | Jones et al. | |
| 9,031,680 B2 | 5/2015 | Napadensky | |
| 9,122,819 B2 | 9/2015 | McDowell et al. | |
| 9,216,547 B2 | 12/2015 | Elsey | |
| 9,491,987 B2 | 11/2016 | Antonelli et al. | |
| 10,362,831 B2* | 7/2019 | Bigolin | A43B 5/14 |
| 10,426,220 B2* | 10/2019 | Blunkall | A43B 23/0235 |
| 10,426,226 B2* | 10/2019 | Guyan | A43B 23/028 |
| 10,493,697 B2* | 12/2019 | Miller | B29C 64/393 |
| 2010/0140852 A1 | 7/2010 | Kritchman et al. | |
| 2015/0282564 A1* | 10/2015 | Meschter | A43B 23/227 |
| | | | 36/45 |
| 2015/0321418 A1 | 11/2015 | Sterman et al. | |
| 2016/0219982 A1 | 8/2016 | Waatti | |
| 2016/0331068 A1 | 11/2016 | Bigolin | |
| 2017/0120514 A1 | 5/2017 | Miller | |
| 2018/0147752 A1* | 5/2018 | Nurnberg | A43B 5/00 |
| 2018/0242694 A1* | 8/2018 | Webster | A43B 23/0245 |

FOREIGN PATENT DOCUMENTS

| | | |
|---|---|---|
| CN | 206938526 U | 1/2018 |
| EP | 2 338 371 A1 | 6/2011 |
| EP | 2 594 146 A1 | 5/2013 |
| TW | 201526813 A | 7/2015 |

OTHER PUBLICATIONS

International Search Report and Written Opinion for related International Application No. PCT/US2019/033679, dated Sep. 10, 2019, 14 pages.

* cited by examiner

ARTICLES OF FOOTWEAR WITH PRINTED MATERIAL DEPOSITED THEREON

FIELD

This disclosure relates generally to articles of footwear and/or apparel with printed material deposited thereon and to printing systems and methods for printing onto articles of footwear and/or apparel.

BACKGROUND

Articles of footwear and/or apparel can have printed material deposited thereon with a printing system.

Printing systems include two-dimensional and three-dimensional printing systems. Such systems can be used to deposit printed material onto textile materials used in various articles of footwear and/or articles of apparel.

DETAILED DESCRIPTION

General Considerations

Figure 1A:
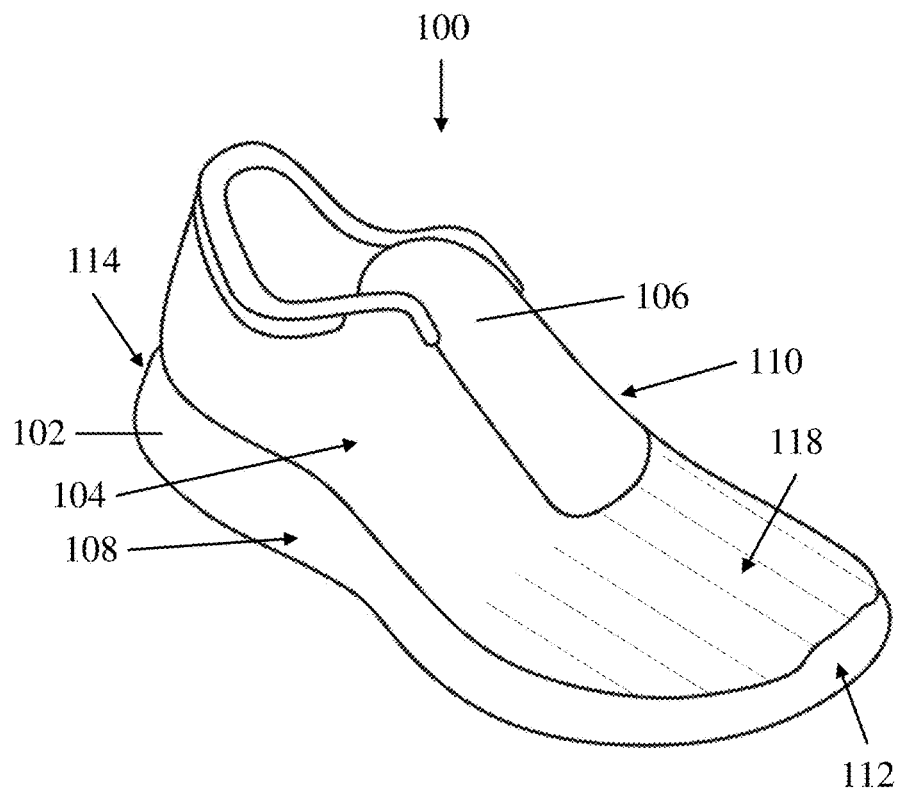
FIG. 1A depicts a perspective view of an exemplary article of footwear having various printed materials that are homogenous in appearance deposited thereon.

For purposes of this description, certain aspects, advantages, and novel features of the embodiments of this disclosure are described herein. The described methods, systems, and apparatus should not be construed as limiting in any way. Features, characteristics, and/or groups described in conjunction with a particular aspect, embodiment or example are to be understood to be applicable to any other aspect, embodiment or example described herein unless incompatible therewith. All of the features disclosed in this specification (including any accompanying claims, abstract, and drawings), and/or all of the steps of any method or process so disclosed, may be combined in any combination, except combinations where at least some of such features and/or steps are mutually exclusive. The disclosure is not restricted to the details of any foregoing embodiments. The disclosure extends to any novel one, or any novel combination, of the features disclosed in this specification (including any accompanying claims, abstract, and drawings), or to any novel one, or any novel combination, of the steps of any method or process so disclosed.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, systems, and apparatus can be used in conjunction with other systems, methods, and apparatus.

The explanations of terms and abbreviations herein are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

As used herein, the term "and/or" used between the last two of a list of elements means any one of, or any combination of, the listed elements. For example, the phrase "A, B, and/or C" means "A," "B," "C," "A and B," "A and C," "B and C," or "A, B, and C."

As used herein, the terms "attached" and "coupled" generally mean physically connected or linked, which includes items that are directly attached/coupled and items that are attached/coupled with intermediate elements between the attached/coupled items, unless specifically stated to the contrary.

Also as used herein, the terms "printing" or "printed," and "depositing" or "deposited," are each used synonymously, and are intended to refer to the association of a material from a source of the material to a receiving surface or object.

As used herein, the term "approximately" means the listed value and any value that is within 10% of the listed value. For example, "approximately 50%" means any value between 45-55%, inclusive.

As used herein, the term "adjacent" refers to abutting areas of a material or structure. For example, two "adjacent" segments of printed material abut one another, such that the segments are in contact or have no gap therebetween.

As used herein, the term "same," "uniform," or "homogenous," in the context of characteristics or properties of a material or structure, means that two compared features are identical or similar enough that an ordinary observer, without specialized equipment and upon a casual inspection (such as in a commercial setting), would believe the compared features to be the same. For example, a first printed material can have an appearance that is the same as that of a second printed material. This means that the appearance of the materials for the compared characteristic (e.g., color, thickness) is sufficiently similar that, to an ordinary observer without specialized equipment, the appearance of the two materials does not appear to be different.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the detailed description, claims, abstract, and drawings.

Introduction to the Disclosed Technology

The printing systems and methods described herein can be used to apply a printing material onto a substrate. The printed material can form an aesthetic and/or structural feature on the substrate.

The substrate can, for example, include articles of footwear and articles of apparel (individually or collectively referred to herein as "articles"). For example, articles of footwear can include running shoes, soccer shoes, football shoes, rugby shoes, basketball shoes, baseball shoes, sneakers, hiking boots, sandals, socks, and other types of footwear. Articles of apparel can, for example, include hats, scarves, jackets, shirts, dresses, sweaters, gloves, undergarments, ties, vests, shorts, pants, as well as other wearable and non-wearable softgoods, such as bags and the like.

In typical printing systems, the system can print material on articles that performs only one function, that is, either an aesthetic function or a structural function. Thus, for an article to have both aesthetic features and structural features, multiple processes and/or systems must be used. An aesthetic feature can, for example, include color, graphics, and/or other visual and/or textural characteristics. For example, a structural feature can alter and/or enhance one or more performance characteristic of the substrate, such as the flexibility, abrasion resistance, and/or traction of the article.

The disclosed systems and methods advantageously provide a single printing process that can be used to print aesthetic features and/or structural features. As such, the disclosed technology can, for example, provide more efficient manufacturing compared to the typical systems and methods.

The disclosure also provides exemplary systems and methods that enable aesthetic features to also function as structural features, and vice versa. Accordingly, the technology can, for example, provide design and/or performance options for articles that are significantly more customizable than those of typical systems and methods.

For example, the disclosed printing systems and methods can be used to print a printed layer on an upper of an article of footwear. The printed layer can have one or more printed materials. The printed materials can have various aesthetic properties, including color, texture, gloss level, etc., and various structural properties such as flexibility, hardness, etc.

Two or more printed materials can, in some instances, have the same or similar aesthetic properties (e.g., color) and have different structural properties (e.g., hardness). The printed materials can be configured and/or arranged on the upper to alter and/or enhance various performance characteristics to the upper, such as strength, abrasion resistance, flexibility, etc.

As used herein, the term "hardness" refers to a material's resistance to indentation, and the term "stiffness" refers to the rigidity of an object (i.e., the extent to which it resists bending in response to an applied force). In general, for the materials described herein, the greater the hardness of a material (e.g., a printed material) applied to a surface, the greater the stiffness (i.e., rigidity) of the object in the area on which the material is applied.

Exemplary Embodiments

In one representative embodiment, an article of footwear comprises a sole structure, an upper coupled to the sole structure, and a printed layer disposed on the upper. The printed layer includes first and second printed materials. The first printed material has a plurality of spaced-apart first segments, and the first printed material has a first hardness. The second printed material has a plurality of spaced-apart second segments, and each of the second segments is disposed adjacent to one or more of the first segments. The second printed material has a second hardness that is less than the first hardness of the first printed material.

In some embodiments, the first and second segments are arranged in an alternating pattern. For example, the segments are arranged in a first segment-second segment-first segment-second segment and so forth pattern.

In some embodiments, the first printed material has a first appearance, and the second printed material has a second appearance that is the same as the first appearance. In some embodiments, the first and second appearances include a color and a texture of the respective first and second printed materials.

In some embodiments, the first printed material has a first thickness, and the second printed material has a second thickness that is the same as the first thickness.

In some embodiments, the first and second segments are disposed on a toe portion of the upper, and each of the first and second segments extend longitudinally from the toe portion of the upper toward a heel portion of the upper.

In some embodiments, the printed layer further includes a third printed material disposed adjacent to the first printed material or the second printed material, and the third printed material has a third hardness that is less hard than the first hardness and that is harder than the second hardness.

In some embodiments, the upper includes a toe portion and one or more side portions, the first and second printed material are disposed on the toe portion, the printed layer further includes a third printed material disposed on the one or more side portions, and the third printed material has a third hardness that is different than the first hardness and the second hardness.

In some embodiments, the upper includes a toe portion, one or more side portions, and a heel portion, the first printed material is disposed on the toe portion, the second printed material is disposed on the one or more side portions, and the printed layer further includes a third printed material disposed on the heel portion and having a third hardness that is different than the first hardness and the second hardness.

In some embodiments, the first hardness is lower than the second hardness and the third hardness, and the third hardness is higher than the first hardness and the second hardness.

In some embodiments, the first hardness and the second hardness are determined using a Shore durometer test. For example, the Shore durometer can be determined using a standard test, such as the ASTM D2240 standard. In some embodiments, the first hardness is within a range of 50 A-100 A on a Shore A durometer scale, and the second hardness is within a range of 15 A-49 A on the Shore A durometer scale.

In another representative embodiment, an article of footwear comprises a sole structure, an upper coupled to the sole structure, and a printed layer disposed on the upper. The printed layer includes a plurality of printed materials each having a different hardness than an adjacent printed material. The plurality of printed materials is arranged on the upper such that a stiffness of the upper is gradated from a toe portion of the upper to a heel portion of the upper, wherein a stiffness of the heel portion is greater than a stiffness of the toe portion.

In some embodiments, the stiffness of the article and/or a portion of the article can be determined using a standard stiffness test. For example, the stiffness can be determined using a three-point bend test (e.g., ASTM D790). The stiffness can, for example, be measured in pounds per inch (lbs./in.) or newtons per meter (N/m).

In some embodiments, the printed layer is a second printed layer, and the article of footwear further comprises a first printed layer on which the second printed layer is disposed.

In some embodiments, the upper further comprises first and second side portions, and the plurality of printed materials is arranged on the upper such that stiffnesses of either or both of the first and second side portions is less than the stiffness the heel portion and greater than the stiffness of the toe portion.

In some embodiments, the plurality of printed materials includes first, second, third, and fourth printed materials. The first printed material is disposed on the toe portion of the upper, and the first printed material has a first hardness. The second printed material is disposed on the first side portion of the upper, and the second printed material has a second hardness. The third printed material is disposed on the second side portion of the upper, and the third printed material has a third hardness. The fourth printed material is disposed on the heel portion of the upper, and the fourth printed material has a fourth hardness. The first hardness is less than the second hardness, the third hardness, and the fourth hardness. The second hardness is less than the fourth hardness. The third hardness is less than the fourth hardness.

In some embodiments, the first, second, third, and fourth printed materials have the same thickness.

In some embodiments, the first hardness of the toe portion is within a range of 15 A-49 A on a Shore A durometer scale, and the fourth hardness of the heel portion is within a range of 50 A-100 A on the Shore A durometer scale.

In some embodiments, the printed layer has a uniform color.

In yet another representative embodiment, a method of printing onto an article of footwear is provided. The method comprises printing a printed layer onto an upper of an article of footwear. Printing the printed layer includes depositing a first printed material onto a first portion of the upper, and the first printed material has a first hardness; depositing the first printed material onto a second portion of the upper, and the second portion of the upper is spaced apart from the first portion of the upper. Printing the printed layer further includes depositing a second printed material onto a third portion of the upper, and the second printed material has a second hardness that is less than the first hardness of the first printed material, and the third portion of the upper is disposed between the first and second portions of the upper.

In some embodiments, the printed layer is printed onto the upper when the upper is in a flat configuration, and the method further comprises partially curing the printed layer while the upper is in the flat configuration.

In some embodiments, after the printed layer is partially cured, the method further comprises forming the upper into a curved configuration and fully curing the printed layer.

In some embodiments, the printed layer is printed on the upper while the upper is in a curved configuration.

Figure 3A:
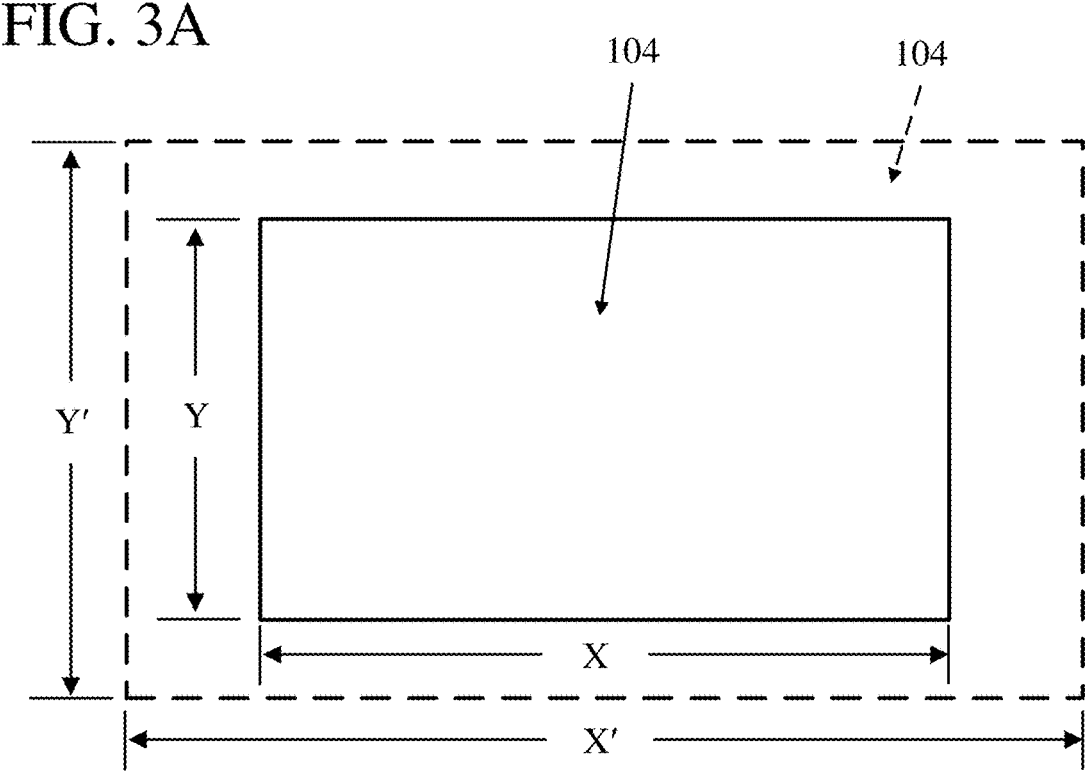
FIG. 3A depicts a plan view of a portion of the upper of the article of footwear of FIG. 1A without the printed material deposited thereon and illustrates certain properties of the upper.
Figure 3B:
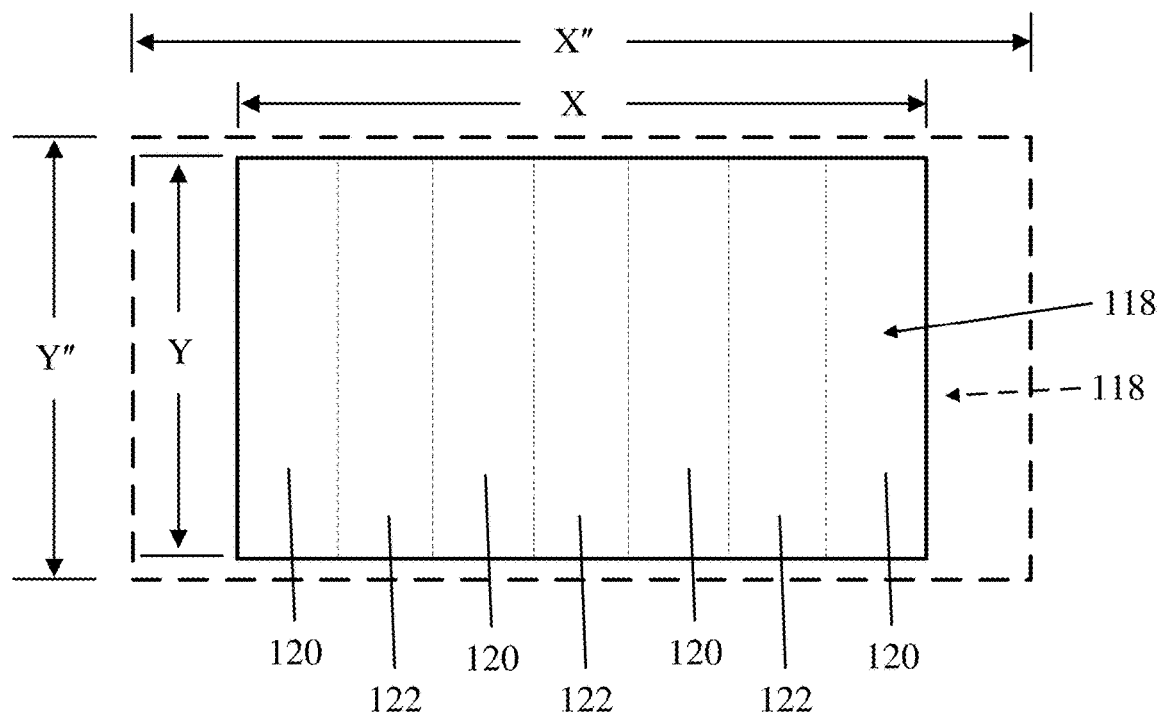
FIG. 3B depicts a plan view of a portion of the upper of the article of footwear of FIG. 1A with the printed material deposited thereon and illustrates certain properties of the upper with the printed material deposited thereon.
Figure 4:
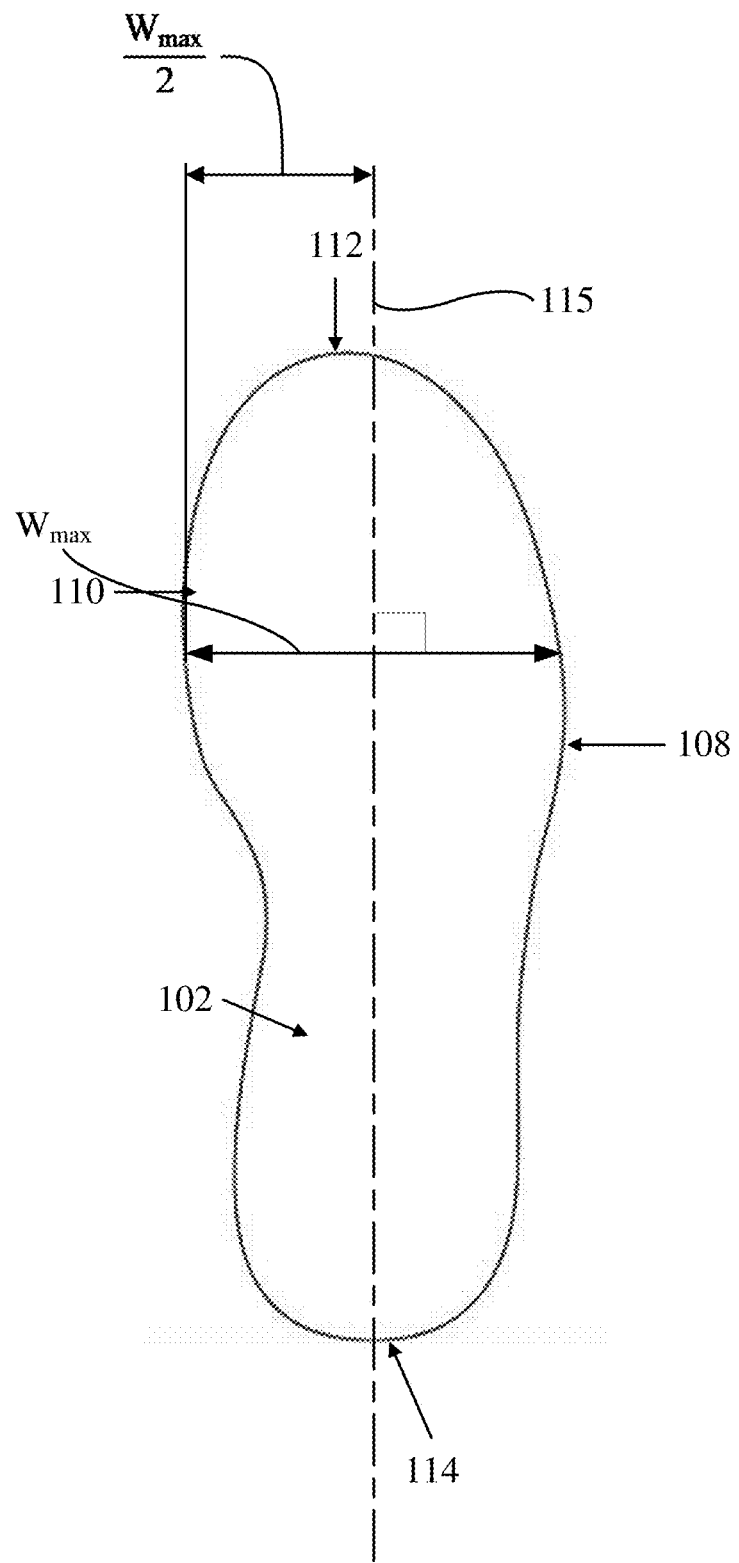
FIG. 4 depicts a plan view of the sole structure of the article of footwear of FIG. 1A.

FIGS. 1A-4 depict an exemplary article of footwear 100 and its components. Referring to FIG. 1A, the article 100 can include a sole structure 102, an upper 104, and a tongue 106. The upper 104 can be coupled to the sole structure 102, and the tongue 106 can be coupled to or integrally formed with the upper 104. The article 100 can also have a lateral side portion 108 and a medial side portion 110. As shown in FIG. 4, the lateral and medial side portions 108, 110 can be defined by a plane 115 that extends from a toe portion 112 of the article to the heel portion 114 of the article, bisecting the widest part ($W_{max}$) of the sole structure 102, and in a superior/inferior direction (e.g., out of the page).

The upper 104 can be formed of one or more materials, including a textile, a natural fabric, a synthetic fabric, a knit, a woven material, a nonwoven material, a mesh, a leather, a synthetic leather, a polymer, a rubber, and a foam, or any combination of these materials. In some embodiments, the upper 104 can itself be a printed layer of material constructed using the printing systems described herein or other 3D printing system.

The article 100 can include one or more printed layers deposited on the article. For example, referring to FIGS. 1B and 2, the article 100 includes a first printed layer 116 and a second printed layer 118 deposited on the upper 104. Additionally or alternatively, the article can have one or more printed layers deposited on other portions of the article 100 such as the sole structure 102 and/or the tongue 106. In the illustrated embodiment, the printed layers 116, 118 are deposited on the toe portion of the upper. In other embodiments, the printed layers and/or additional printed layers can be deposited on various other portions of the upper such as the side portions and/or the heel portion in the same manner as described herein with regard to the toe portion of the upper.

Figure 2:
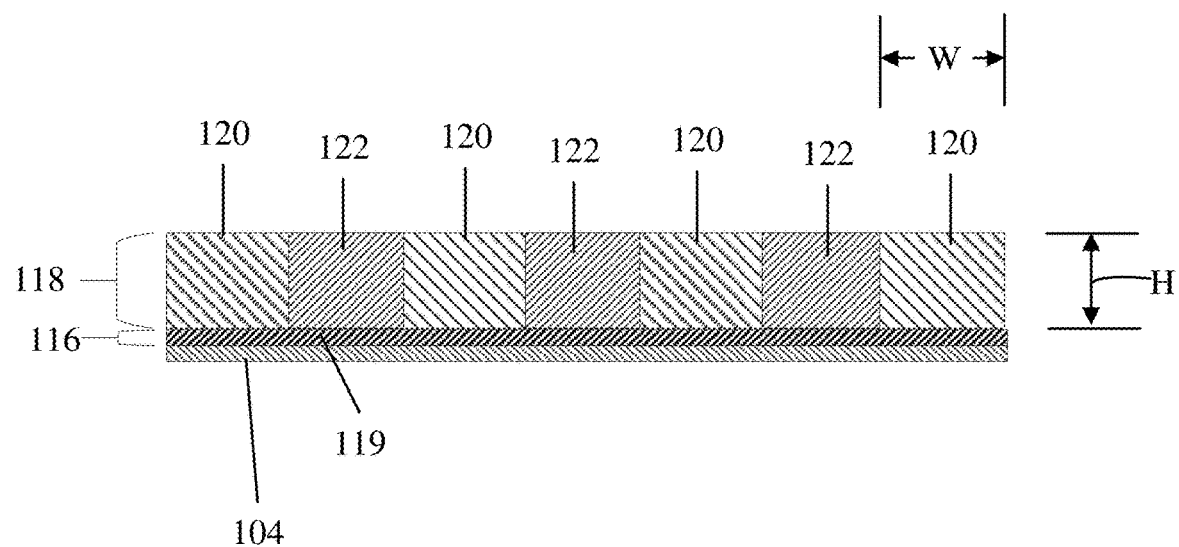
FIG. 2 depicts a partial cross-sectional view of an upper of the article of footwear of FIG. 1A with the printed material deposited thereon.

Referring to FIG. 2, the first printed layer 116 can be printed onto the upper 104, and the second printed layer 118 can be printed onto the first printed layer 116. In other embodiments, there can be less or more than two printed layers (e.g., 1-10 layers). For example, the second printed layer 118 can be printed directly onto the upper 104 and/or additional layers can be printed on the second printed layer 118. The first and second printed layers 116, 118 can be printed onto the upper 104 with a printing system, such as those described below herein.

Figure 1B:
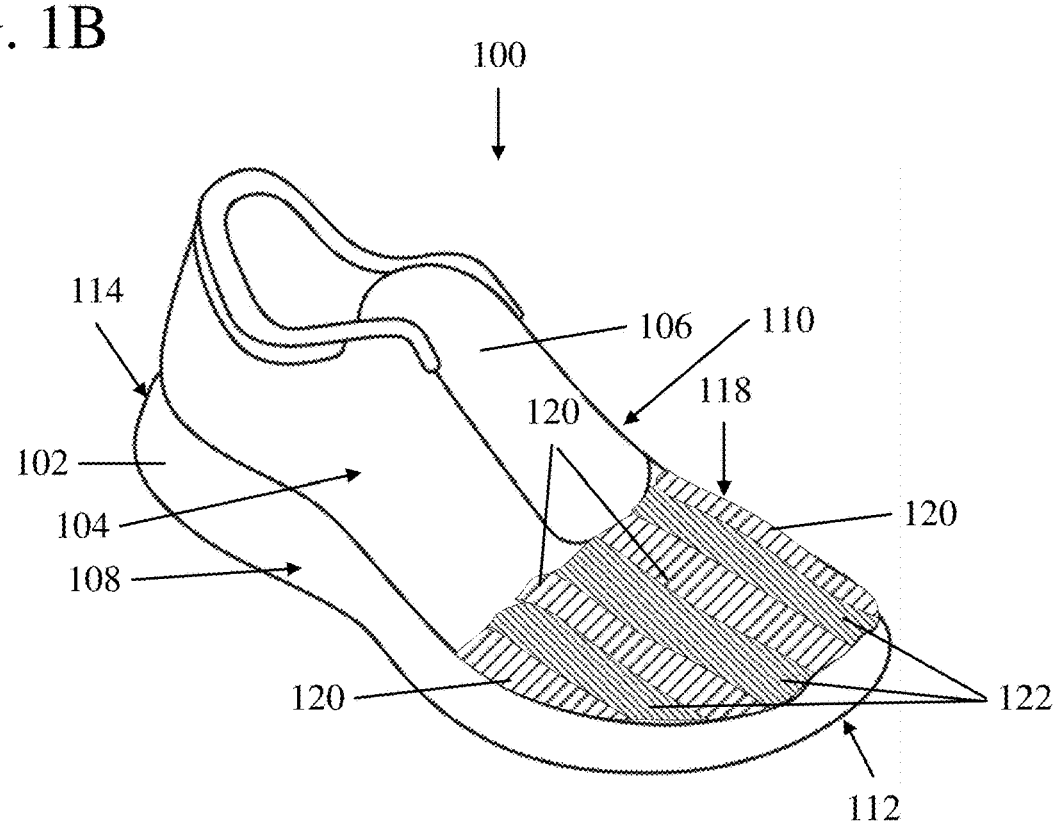
FIG. 1B depicts a perspective view of the article of footwear of FIG. 1A with each of the printed materials shown with different hatching to illustrate certain properties of the printed materials.

The printed layers 116, 118 of the article 100 can comprise one or more printed materials, which can comprise a resin, acrylic, ink, and/or other printable material. For example, referring still to FIG. 2, the first printed layer 116 can include a first printed material 119, and the second printed layer 118 includes a second printed material 120 and a third printed material 122. The second and third printed materials 120, 122 of the second printed layer 118 are each arranged in a plurality of spaced-apart segments (e.g., rows). Each segment of the second printed material 120 is disposed adjacent to one or more of segments of the third printed material 122. In other words, the second and third printed materials 120, 122 are arranged in an alternating pattern (i.e., the medial/lateral direction) on the toe portion of the upper 104, as shown in FIG. 1B such that each of the third printed material 122 is disposed between a respective pair of segments of the second printed material 120.

Each of the printed materials can include various physical properties, including aesthetic properties (e.g., color, texture, gloss level, etc.) and structural properties (e.g., hardness, flexibility, abrasion resistance, shape, height, width, length, etc.). For example, in the illustrated embodiment, the printed materials 119, 120, 122 can each have various properties, including: color (e.g., white, blue, green, etc.), transparency (e.g., opaque or clear), texture (e.g., smooth, rough, textured), and hardness (e.g., 15 A-100 A measured on a Shore A durometer scale or 50 D-100 D measured on a Shore D durometer scale). In some embodiments, one or more of the properties of one printed material can be the same as or different than the respective properties of one or more other printed materials. For example, in the illustrated embodiment, the second and third printed materials 120, 122 of the second printed layer 118 are the same color. As such, the second printed layer 118 has a homogenous appearance, as shown in FIG. 1A.

Although the second and third printed materials 120, 122 of the second printed layer 118 have homogenous aesthetic properties, the second and third printed materials do not have homogenous structural properties. For example, the second printed material 120 comprises a relatively hard, stiff material (e.g., 70 A), which can, among other things, provide abrasion resistance to toe portion of the upper 104. The third printed material 122 comprises a relatively soft, flexible material (e.g., 40 A), which can, among other things, allow the toe portion of the upper 104 to remain flexible.

Printing alternating rows of printed material having different hardness and/or flexibility onto an upper can, for example, be used to control and/or adjust the flexibility of the upper 104. For example, the upper 104 can, in some embodiments, be formed of a material that is stretchable in one or more directions. The printed material can be arranged on the upper so as to control (e.g., limit or reduce) flexibility in one or more directions to a greater extent than one or more other directions.

For example, FIG. 3A shows the toe portion of the upper 104 without the printed material deposited thereon and in a relaxed state. In the relaxed stated, the toe portion of the upper 104 has dimensions X and Y. FIG. 3A also shows the extent to which the toe portion of the upper 104 can be stretched (i.e., elastically deformed), as illustrated by the broken lines. In this first stretched state, the toe portion of the upper 104 has dimensions X' and Y'. X' is greater than X, Y' is greater than Y, and the difference $\Delta X'$ (i.e., X'–X) is proportionate to $\Delta Y'$ (i.e., Y'–Y). Thus, without the printed material described herein, the toe portion of the upper 104 can stretch a certain amount (evenly or unevenly, depending on the natural characteristics of the upper material) in both the X and Y directions.

FIG. 3B shows the toe portion of the upper 104 with the first and second printed layers 116, 118 deposited thereon and in the relaxed state. In the relaxed state, the toe portion of the upper has the dimensions X and Y. FIG. 3B also shows the extent to which the toe portion of the upper 104 can stretch now that the printed material is deposited thereon, as illustrated by the broken lines. In this second stretched state, the toe portion of the upper 104 has dimensions X" and Y". X" is greater than X and less than X', Y" is greater than Y and less than Y', and the difference $\Delta X''$ (i.e., X"–X) is not proportionate to $\Delta Y''$ (i.e., Y"–Y). In other words, the toe portion of the upper 104 can stretch to a greater extend in the X direction than in the Y direction. This is because the rows of flexible third printed material 122 only extends partially across the toe portion in the X direction, which allows the toe portion to articulate and stretch in the X direction between the rows of the stiff second printed material 120. In the Y direction, the rows of the relatively stiff second printed material 120 extend over the entire length of the toe portion in the Y direction, which restricts the extent to which the toe portion can stretch in the Y direction.

In other embodiments, the printed materials (e.g., the second and third printed materials 120, 122) can be arranged in various other ways to achieve a desired performance. For example, alternating rows of printed materials can extend in the medial/lateral directions (e.g., rotated 90 degrees from the orientation shown in FIGS. 1A-1B) to allow greater flexibility in the anterior/superior directions than the medial/lateral directions. In other embodiments, alternating rows of printed materials can be angled (e.g., 0 to 90 degrees) relative the anterior/posterior and/or medial/lateral directions.

In lieu of or in addition to the printed layers 116, 118 on the toe portion of the upper 104, one or more other printed layers can be deposited on various other portions (e.g., one or more side portions and/or the heel portion) of the article 100.

It should be noted the dimensions or other characteristic of the printed materials 119, 120, 122 can be varied. For example, although the illustrated embodiment depicts the second and third printed materials 120, 122 having substantially equal length, widths W, and heights H (see FIGS. 1B and 2), one or more of these dimensions of the printed materials can be altered. For example, the width of the second printed material 120 can be much greater than the width of the third printed material 122. In this configuration, the toe portion of the upper would have increased abrasion resistance due to the hard second printed material covering more than the majority of the toe portion. Also, due to the flexibility of the second printed material, the toe portion of the upper would still be able to articulate and stretch at the locations between the rows of the second printed material where the third printed material is deposited.

Figure 5:
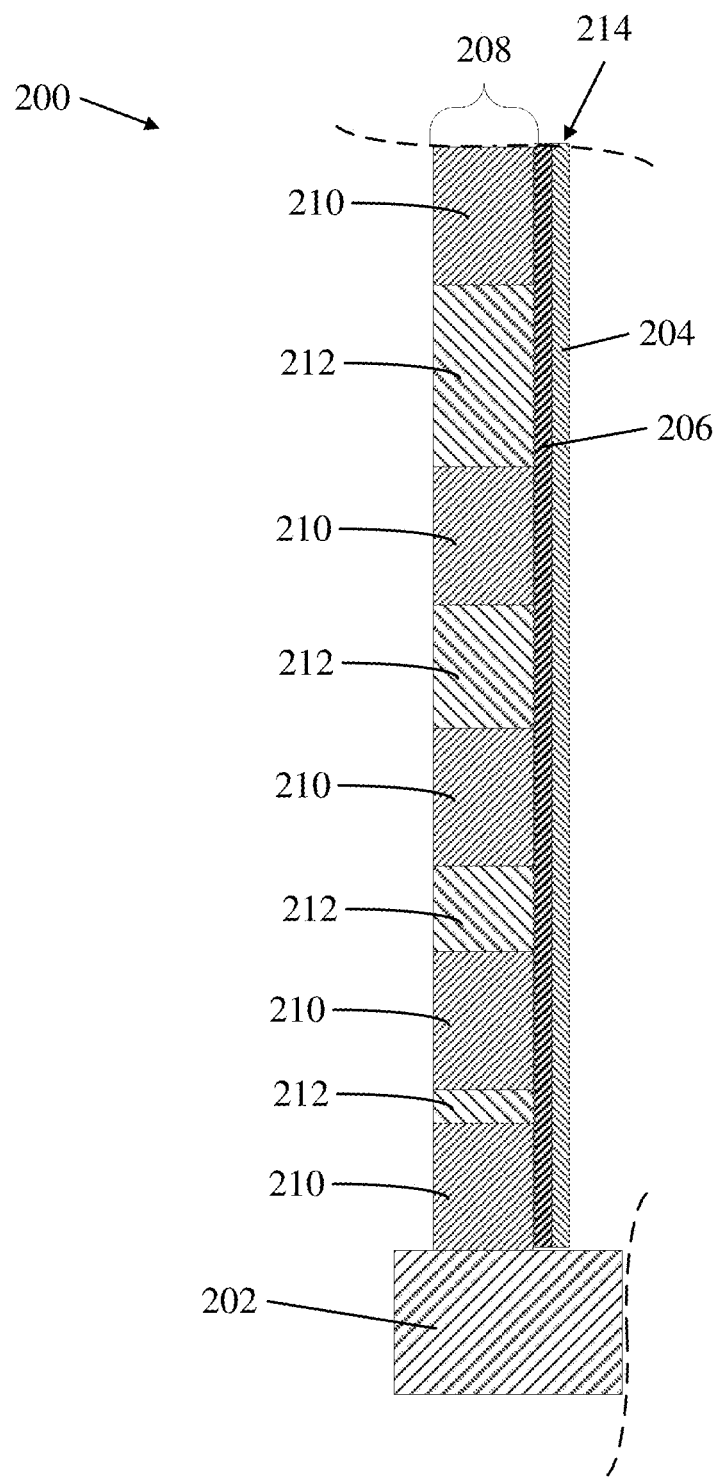
FIG. 5 depicts a partial cross-sectional view of another exemplary article of footwear with various printed materials deposited thereon.

FIG. 5 depicts a side portion of another exemplary article 200, which is shown schematically in partial cross section. The article 200 can comprise a sole structure 202, an upper 204 coupled to the sole structure 202, and one more printed layers deposited on the upper 204 (e.g., a first printed layer 206 and a second printed layer 206). The first printed layer 206 can be deposited onto the upper 204, and the second printed layer 208 can be deposited on the first printed layer 206. Compared to the article 100, which has the second printed layer 118 with printed material arranged in an alternating pattern with even spacing therebetween, the article 200 has the second printed layer 208 with the printed material arranged in an alternating pattern with gradated spacing therebetween. The alternating pattern of the article 200 is also arranged to alternate in the inferior/superior direction (e.g., bottom/top in the orientation shown in FIG. 5); whereas, the alternating pattern of the article 100 is arranged to alternate in the medial/lateral direction (e.g., left/right along a surface of the upper).

The second printed layer 208 can comprise one or more printed materials, such as a first printed material 210 and a second printed material 212. The first printed material 210 can be a relatively stiff material (e.g., having a hardness within a range of 10 D-100 D on the Shore D durometer scale or 70 A-100 A on the Shore D durometer scale), and the second printed material 212 can be a relatively flexible material (e.g., having a hardness of 10 A-45 A on the Shore A durometer scale).

As shown in FIG. 5, the first and second printed materials 210, 212 can each comprise one or more segments (e.g., rows). As mentioned above, the first and second printed materials 210, 212 are arranged rows having an alternating pattern with gradated spacing therebetween in the superior/inferior directions (e.g., up/down in the orientation shown in FIG. 5). In some embodiments, the width of the rows of second printed material 212 that are adjacent to the sole structure 202 is less than the width of the rows of second printed material 212 that are adjacent to a superior edge 214 of the upper. Configuring the first and second printed materials 210, 212 in this manner can, for example, provide increased support toward the bottom of the wearer's foot and increased flexibility toward the wearer's ankle.

The gradation of the series of rows or columns can be uniform, with regular and ordered steps either increasing or decreasing the size (e.g., width) of subsequent rows or columns. Alternatively, the gradation can be non-uniform, with irregular changes in the pattern between a series of rows or columns of printed materials.

In other embodiments, the pattern and/or spacing of the alternating material can be configured in various other ways. For example, the pattern depicted in FIG. 5 can be inverted such that the upper is relatively flexible near toward the bottom of the wearer's foot and relatively stiff toward the wearer's ankle.

Figure 6A:
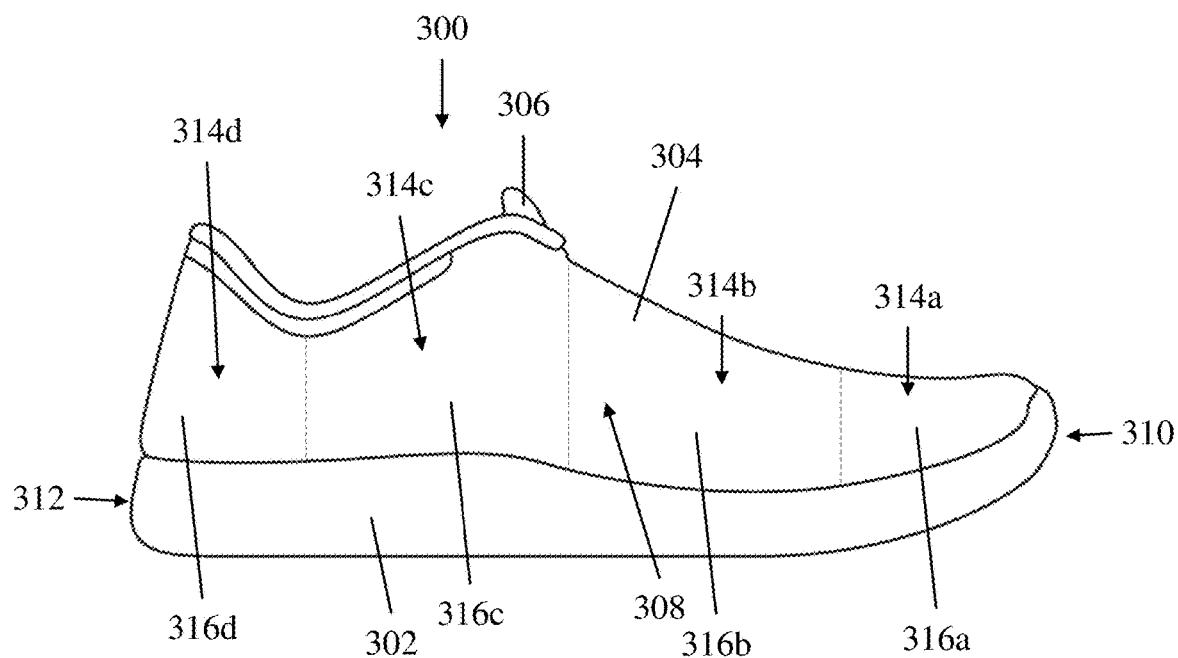
FIG. 6A depicts a side elevation view of an exemplary article of footwear having various printed materials that are homogenous in appearance deposited thereon.
Figure 6B:
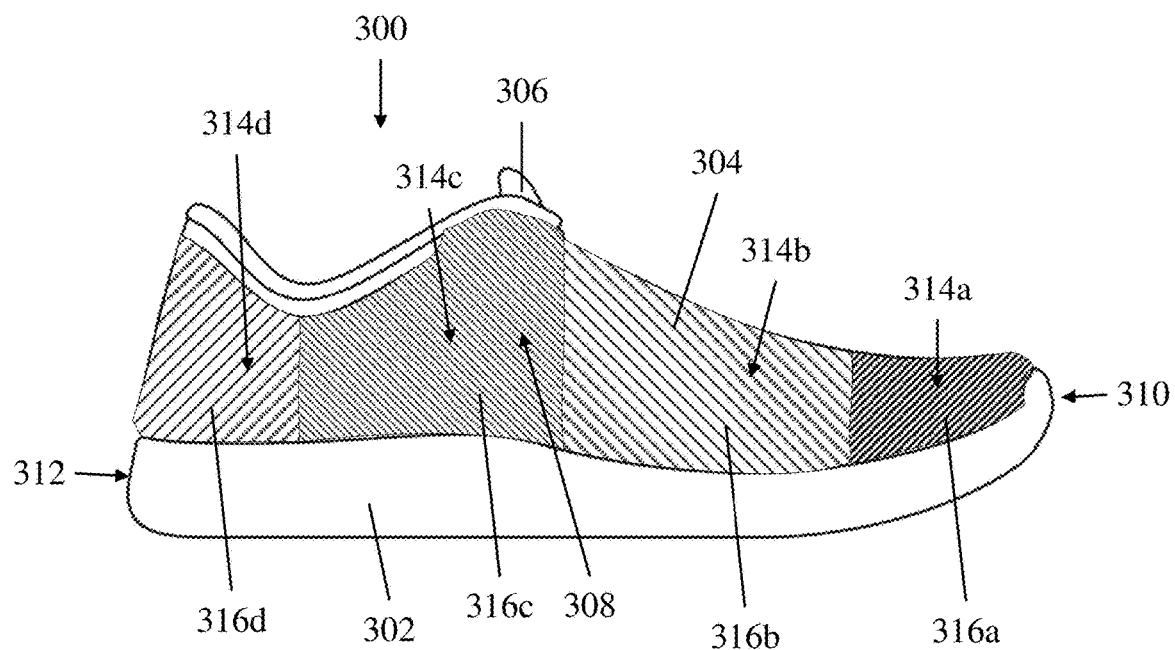
FIG. 6B depicts a side elevation view of the article of footwear of FIG. 6A with each of the printed materials shown with different hatching to illustrate certain properties of the printed materials.

FIGS. 6A-6B depict an exemplary article of footwear 300. Referring to FIG. 6A, the article 300 can include a sole structure 302, an upper 304, and a tongue 306. The upper 304 can be coupled to the sole structure 302, and the tongue 306 can be coupled to the upper 304. The article 300 can also have a lateral side portion 308 and a medial side portion (not shown).

The upper 304 of the article 300 can generally be configured similar to the upper 104 of the article 100. The upper 304 can include one or more sections or portions. In some embodiments, the sections can be integrally formed of a unitary piece of material or fabric. In other embodiments, one or more sections can be formed as separate pieces of material or fabric that are coupled together (e.g., by stitching, adhesive, fasteners, melting, weaving, knitting, and/or other means of coupling). For example, referring to FIG. 6A, in the illustrated embodiment, the upper 304 comprises a first section 314a, a second section 314b, a third section 314c, and a fourth section 314d that are integrally formed as a single component, which are collectively or generically referred to as "the sections 314."

One or more of the sections 314 of the upper 304 can have a printed material deposited thereon. In some embodiments, the printed material can alter the aesthetic properties (look, feel, etc.) and/or the performance properties (flexibility, abrasion resistance, etc.). The printed material can be selected and/or configured to provide desired appearance and/or performance characteristics to the sections 314 of the upper 304 on which the printed material is deposited.

In some embodiments, the sections 314 can have printed materials deposited thereon such that the sections have a homogenous appearance and heterogeneous performance characteristics. For example, as shown in FIG. 6B, each of the sections 314a-314d has a respective printed material 316a-316d deposited thereon. The printed materials 316a-316d deposited on the respective sections 314a-314d of the upper 304 have the same appearance (e.g., the same general appearance of color, texture, etc.), as show in FIG. 6A. As depicted in FIG. 6B, each of the printed materials 316a-316d has one or more different performance characteristics. For example, the first printed material 316a, which is deposited on the first section 314a of the upper 304, has a first hardness and is softer and/or more flexible than the second, third, and fourth printed materials 316b-316d. The second printed material 316b, which is deposited on the second section 314b of the upper 304, has a second hardness and is harder and/or stiffer than the first printed material 316a and softer and/or more flexible than the third and fourth printed materials 316c, 316d. The third printed material 316c, which is deposited on the third section 314c of the upper 304, has third hardness and is harder and/or stiffer than the first and second printed materials 316a, 316b and softer and/or more flexible than the fourth printed material 316d. The fourth printed material 316d, which is deposited on the fourth section 314d of the upper 304, has a fourth hardness and is harder and/or stiffer than the first, second, and third printed materials 316a-316c.

In this configuration, the article 300 has a homogenous appearance, a relatively flexible toe portion of the article 300 (due to the low hardness of the first printed material 316a), a relatively moderately flexible/stiff midfoot portion (due to the medium hardness of the second and third printed materials 316b and 316c), and a relatively stiff heel portion 312 (due to the high hardness of the fourth printed material 316d). In other embodiments, the configuration can be altered to provide stiffness and/or flexibility at the desired location of the shoe.

The printed materials 316a-316d can be configured such that the sections 314 of the upper 304 have a homogenous appearance (e.g., same color). In other embodiments, the sections 314 can have one or more printed materials deposited thereon such that the sections 314 have a heterogeneous appearance (e.g., different colors, patterns, graphics, etc.)

and homogenous performance characteristics (e.g., flexibility, breathability, abrasion resistance, etc.).

Figure 7A:
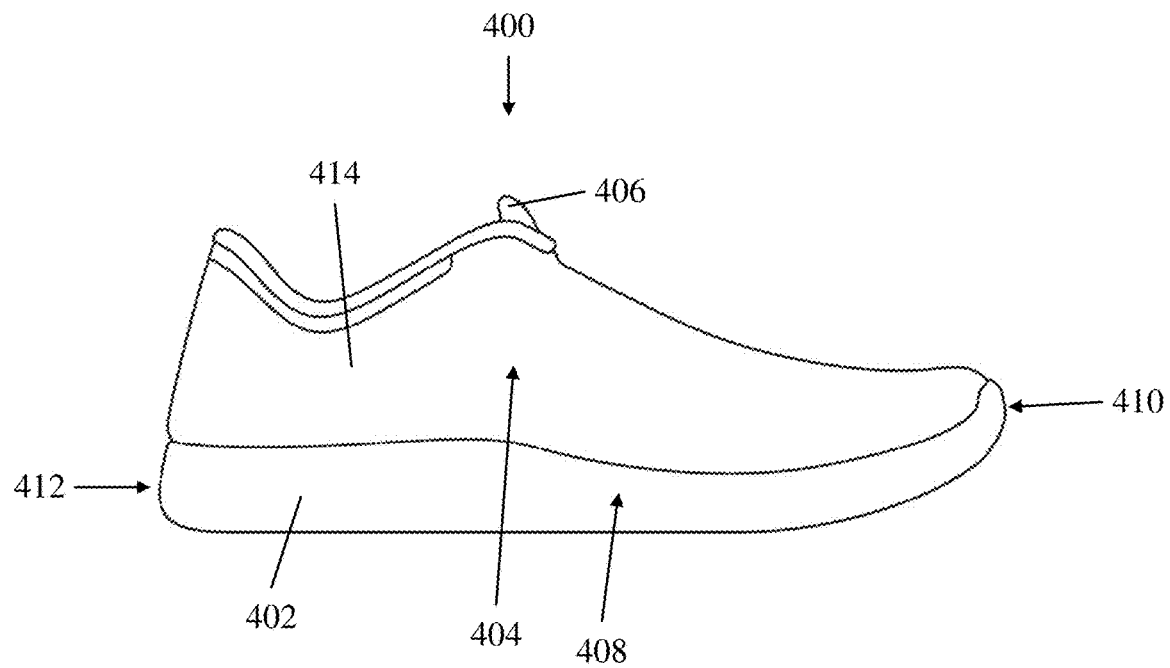
FIG. 7A depicts a side elevation view of an exemplary article of footwear having various printed materials that are homogenous in appearance deposited thereon.
Figure 7B:
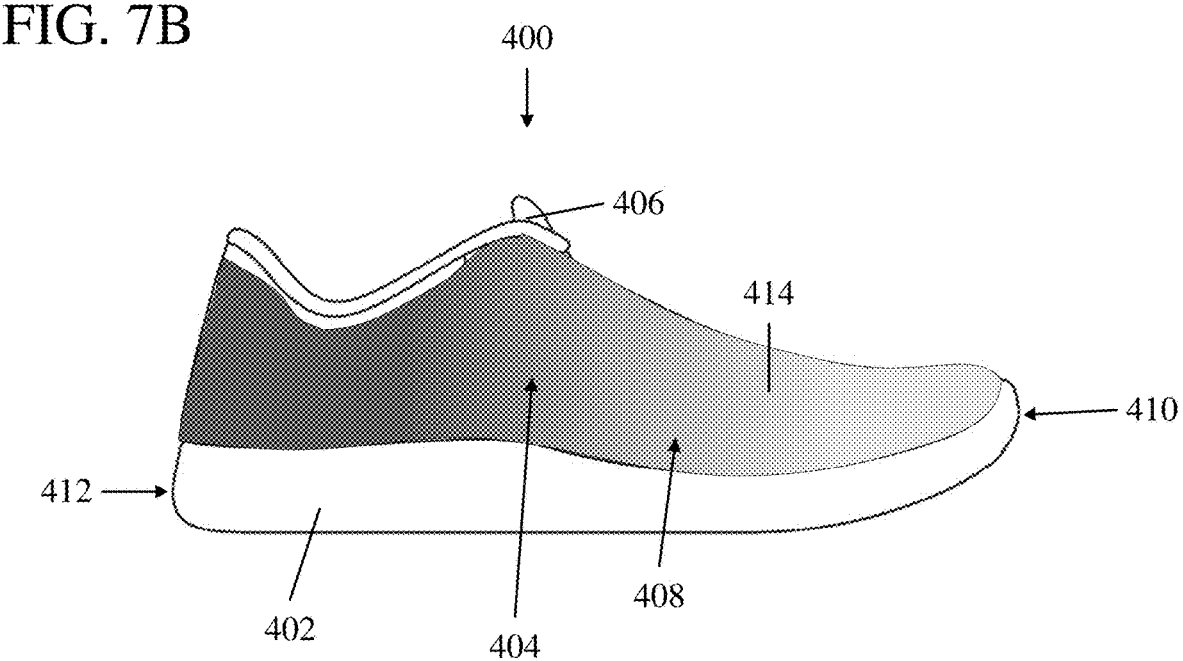
FIG. 7B depicts a side elevation view of the article of footwear of FIG. 7A with the printed materials shown in gradated shading to illustrate certain properties of the printed materials.

Although the exemplary embodiment of FIG. 7B shows a continuously and even gradation that extends along the entire length of the article, it should be understood that the gradation can be irregular (as described above) and/or discontinuous along portions of the article. For example, the article can have a first continuous gradation from a toe portion to a midfoot region (increasing in stiffness), and second continuous gradation extending from the midfoot region to the heel region (decreasing in stiffness). Thus, various portions of the article can be gradated differently.

FIGS. 7A-7B depict an exemplary article of footwear 400. Referring to FIG. 7A, the article 400 can include a sole structure 402, an upper 404, and a tongue 406. The article 400 can be configured generally similar to the article 300. The article 400 can also have a lateral side portion 408 and a medial side portion (not shown).

One or more of the portions of the upper 404 can have a printed material 414 deposited thereon. In some embodiments, the printed material 414 can alter the aesthetic properties (look, feel, etc.) and/or the performance properties (flexibility, abrasion resistance, etc.). The printed material can be selected and/or configured to achieve desired appearance and/or performance characteristics for the portion of the upper 404 on which the printed material is deposited.

In some embodiments, the printed material 414 can include more than one printed material (e.g., 2-6 printed materials). The printed materials can be combined or mixed to achieve gradated performance characteristics. For example, in some embodiments, three printed materials can be selected, each having a different hardness. A first printed material can have a first hardness (e.g., 15 A), a second printed material can have a second hardness (e.g., 40 A), and a third printed material can have a third hardness (e.g., 70 A). The printed materials can dispensed through a print nozzle and deposited onto the upper 404 of the article 400. The proportion of the first, second, and/or third printed materials can be selected to achieve the desired performance characteristics. To achieve gradated performance characteristics, the printed materials can be mixed to achieve hardness in the range of 15 A-70 A.

In some embodiments, the printed material 414 can be gradated from low hardness and high flexibility at the toe portion 410 to high hardness and high stiffness at the heel portion 412, as illustrated in FIG. 7B. This can be accomplished by depositing printed material with a ratio of 100% of the first printed material, 0% of the second printed material, and 0% of the third printed material onto the toe portion 410 of the upper 404. As a result, the printed material on the toe portion 410 has the first hardness (e.g., 15 A). To gradate the hardness from 15 A to 40 A (e.g., from the toe portion to midfoot portion of the upper), the first printed material can be incrementally decreased from 100% to 0%, the second printed material can be incrementally increased from 0% to 100%, and the third material can remain constant at 0%. To gradate the hardness from 40 A to 70 A (e.g., from the midfoot portion to heel portion of the upper), the first printed material can remain constant at 0%, the second printed material can be incrementally decreased from 100% to 0%, and the third printed material can be incrementally increased from 0% to 100%.

The printed material can also be configured in various other ratios. For example, the first, second, and/or third printed materials can be mixed to so as to have a combined percentage of up to 300% (i.e., 100% first printed material, 100% second printed material, 100% third printed material). Additional and/or alternative printed materials can also be used to achieve other characteristics.

As shown in FIG. 7A, the printed materials 414 can have a homogenous appearance despite their various hardnesses. In this configuration, the article 400 has a homogenous appearance, a relatively flexible toe portion 410 of the article 400, a moderately flexible/stiff midfoot portion, and a relatively stiff heel portion 412. In other embodiments, the configuration can be altered to provide various other stiffness and/or flexibility at a desired location of the shoe.

Figure 8A:
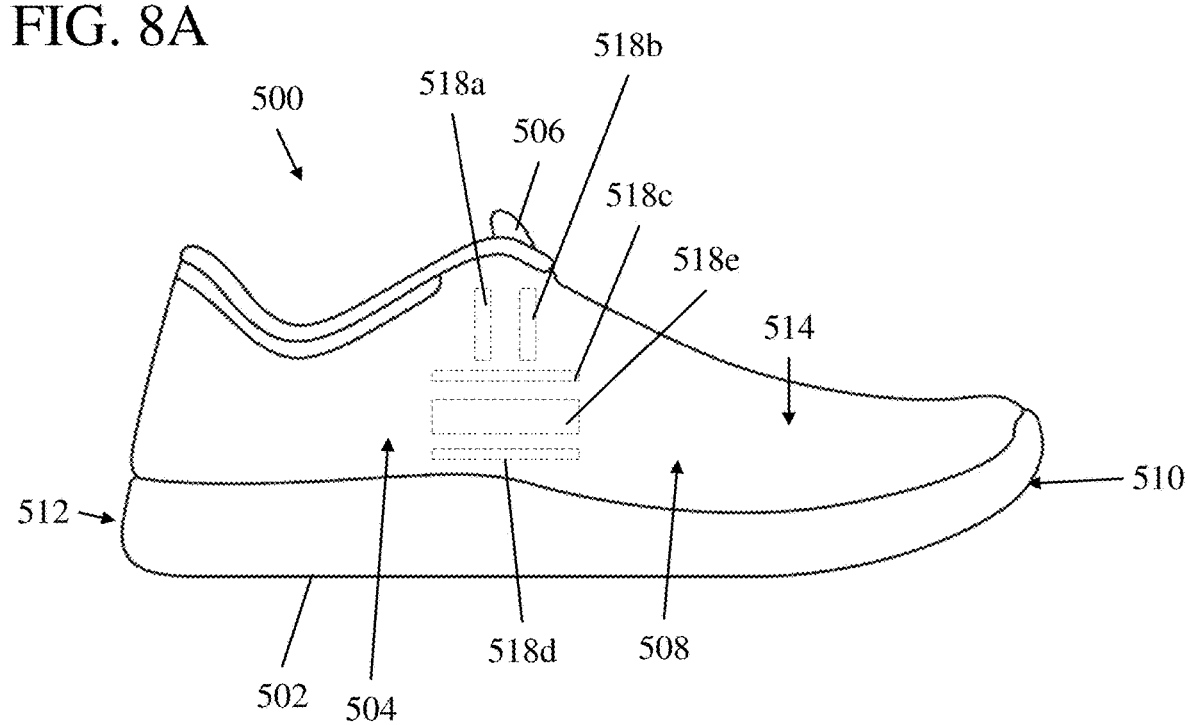
FIG. 8A depicts a side elevation view of an exemplary article of footwear having various printed materials that are homogenous in appearance deposited thereon.
Figure 8B:
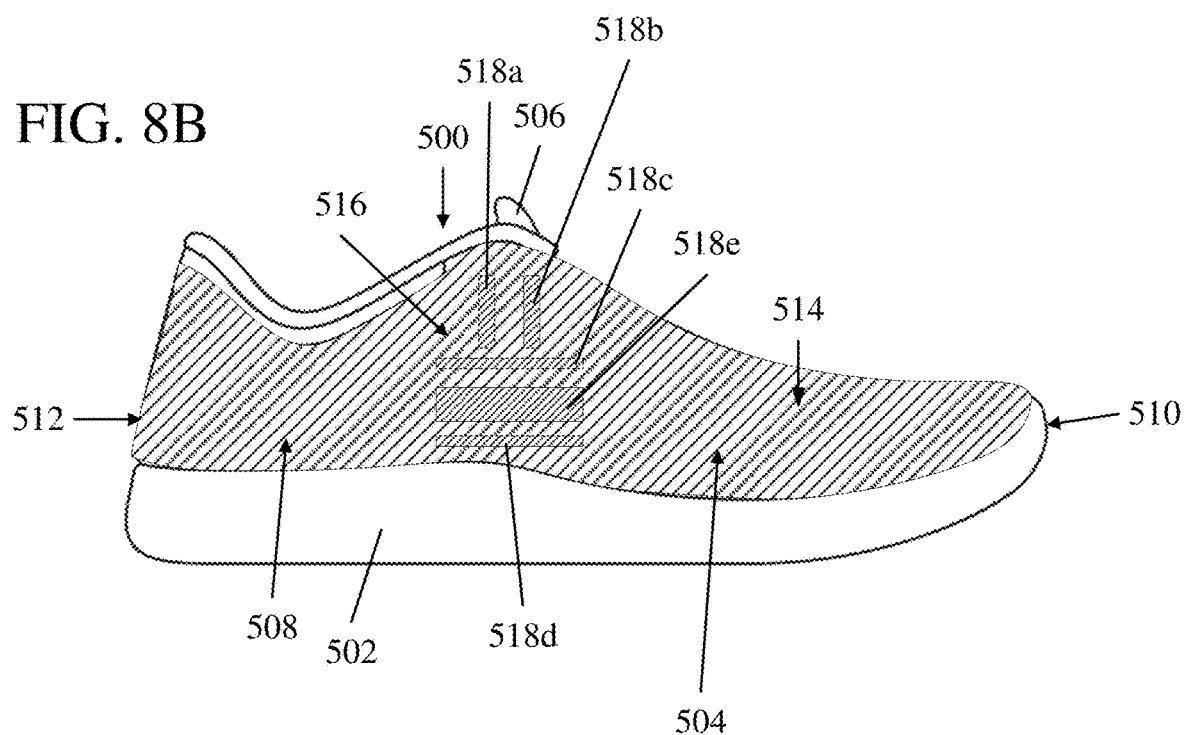
FIG. 8B depicts a side elevation view of the article of footwear of FIG. 8A with each of the printed materials shown with different hatching to illustrate certain properties of the printed material.

FIGS. 8A-8B depict an exemplary article of footwear 500. Referring to FIG. 8A, the article 500 can include a sole structure 502, an upper 504, and a tongue 506. The article 500 can be configured generally similar to the articles of footwear described above. The article 500 can also have a lateral side portion 508 and a medial side portion (not shown).

One or more of the portions of the upper 504 can have printed material 514 deposited thereon. In some embodiments, the printed material can alter the aesthetic properties (look, feel, etc.) and/or the performance properties (flexibility, abrasion resistance, etc.). The printed material can be selected and/or configured to achieve desired appearance and/or performance characteristics for the portion of the upper 504 on which the printed material is deposited.

In some embodiments, the printed material 514 can be deposited on the upper 504 in one or more patterns or designs to achieve one or more desired aesthetic and/or performance characteristics. For example, as shown in FIG. 8B, the printed material 514 comprises a printed pattern 516 disposed on the lateral side portion 508 of the upper 504. The printed pattern 516 can comprise one or more segments or portions 518 that are spaced apart and or adjacent each other. For example, in the illustrated embodiment, the printed pattern 516 includes a plurality of segments 518a-518e, which are collectively or generically referred to as "the segments 518." The segments 518a-518b comprise elongate rows extending in the inferior/superior direction. The segments 518c-518e comprise elongate rows extending in the anterior/posterior direction. The segments 518 of the printed pattern 516 can be arranged in various ways and/or include more or few of the number of segments shown in the illustrated embodiment.

The segments 518 of the printed pattern 516 can be formed of one or more printed materials having various aesthetic and performance properties. In some embodiments, one or more of the segments 518 can be formed from a printed material having one or more characteristics that are different than one or more other segments and one or more other characteristics that are the same as one or more other segments. For example, the printed material that forms the segments 518a and 518b can have a hardness that is different than the hardness of the printed material that forms the segments 518c, 518d, and/or 518e, and the printed material that forms each of the segments 518a-518e can be the same color. In this manner, the printed pattern 516 can provide directional and/or zonal performance characteristics without affecting the appearance of the article 500, as shown in FIG. 8A.

For example, the segments 518a, 518b can be formed from a relatively hard printed material (e.g., material having a hardness of greater than 70 A). In this manner, the segments 518a, 518b can, for example, reduce the flexibility of the portions of the upper 504 on which in the segments 518a, 518b are printed, particularly in the inferior/superior directions.

The segments 518c-518e can be formed from a relatively hard printed material (e.g., material having a hardness of greater than 70 A). In this manner, the segments 518c-518e can, for example, reduce the flexibility of the portions of the upper 504 on which in the segments 518c-518e are printed, particularly in the anterior/posterior directions.

Figure 9A:
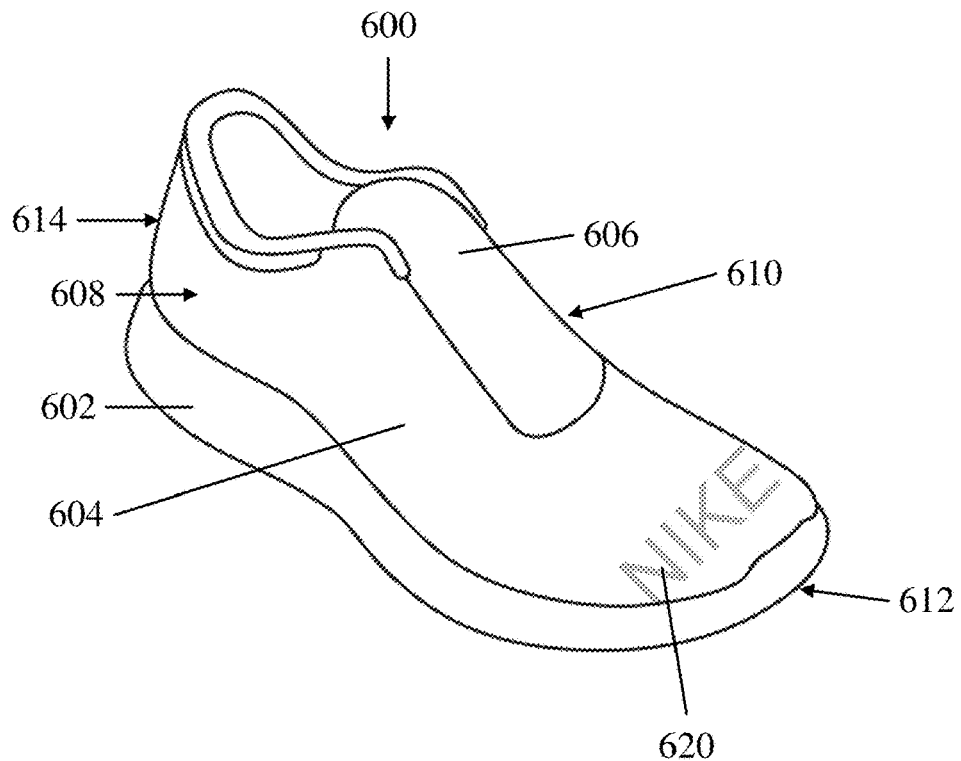
FIG. 9A depicts a perspective view of an exemplary article of footwear having various layers of printed materials deposited thereon.

FIGS. 9A-10B show an exemplary article of footwear 600. Referring to FIG. 9A, the article 600 can include a sole structure 602, an upper 604, and a tongue 606. The article 600 can also have a lateral side portion 608, a medial side portion 610, a toe portion 612, and a heel portion 614. FIG. 9A illustrates an article of footwear with an outer printed layer (i.e., third printed layer 620) covering an inner printed layer that includes a logo, while FIG. 9B illustrates the same article with at least some of the outer printed layer removed to expose the inner printed layer and logo (i.e., second printed layer 618).

Figure 9B:
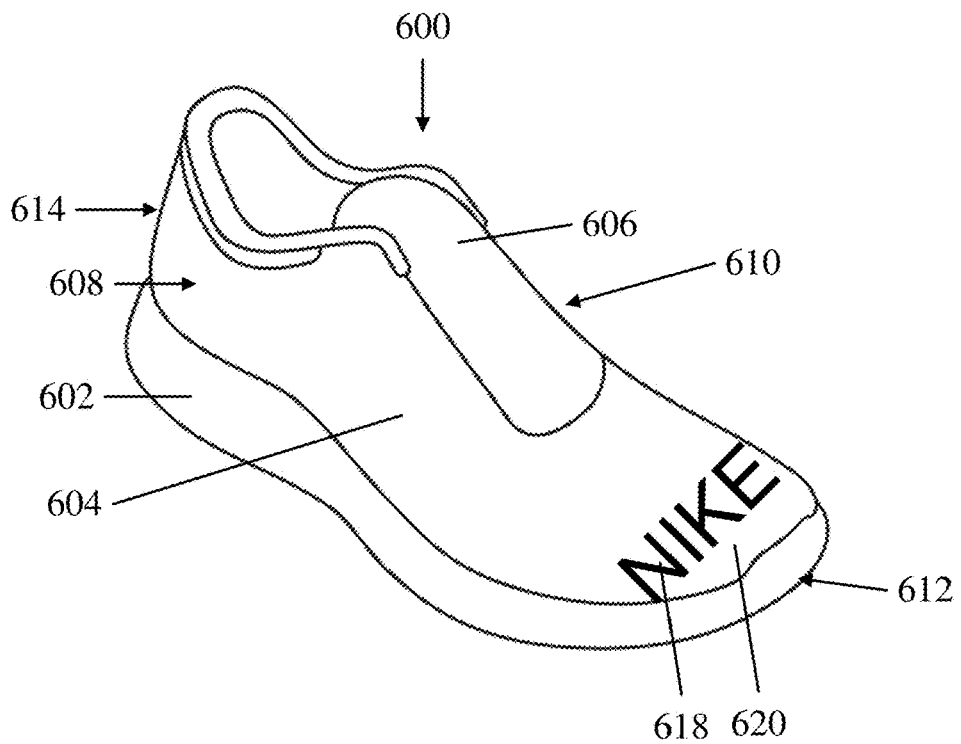
FIG. 9B depicts a perspective view of the article of footwear of FIG. 9A with a portion of an outer layer of the printed materials worn away and portions of another layer of the printed materials exposed.
Figure 10A:
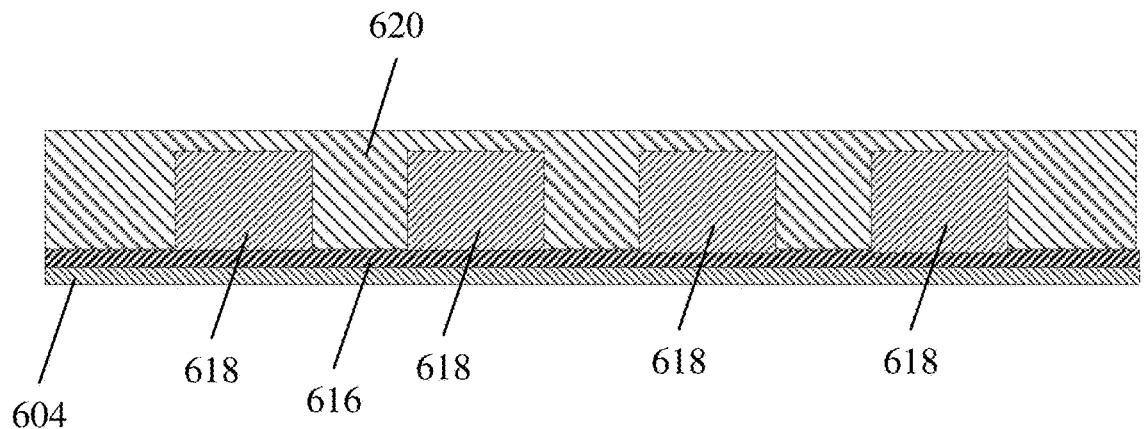
FIG. 10A depicts a partial cross-sectional view of the article of footwear of FIG. 9A.

Referring to FIG. 10A, the upper 604 can have one or more printed materials deposited thereon. In some embodiments, the printed materials can be arranged in various manners, such as layers or patterns. For example, the upper 604 has three printed materials deposited thereon, i.e., a first printed material 616, a second printed material 618, and a third printed material 620. The first printed material 616 can be deposited directly onto the upper 604, and the second printed material 618 can be deposited directly onto the first printed material 616. As shown in FIG. 9B, the second printed material 618 can, in some embodiments, be deposited onto the first printed material 616 in the shape of a pattern, graphic, logo, design, lettering, etc. (e.g., NIKE®). The third printed material 620 can be deposited onto and/or between the first and second printed materials 616, 618 such that the first and second printed materials 616, 618 are covered by the third printed material 620, as shown in FIG. 10A. As shown in FIG. 9A, the third printed material 620 thus covers or conceals the NIKE® logo, which is shown in a lighter contrast in FIG. 9A than FIG. 9B to indicate that it is covered by the third printed material 620.

Figure 10B:
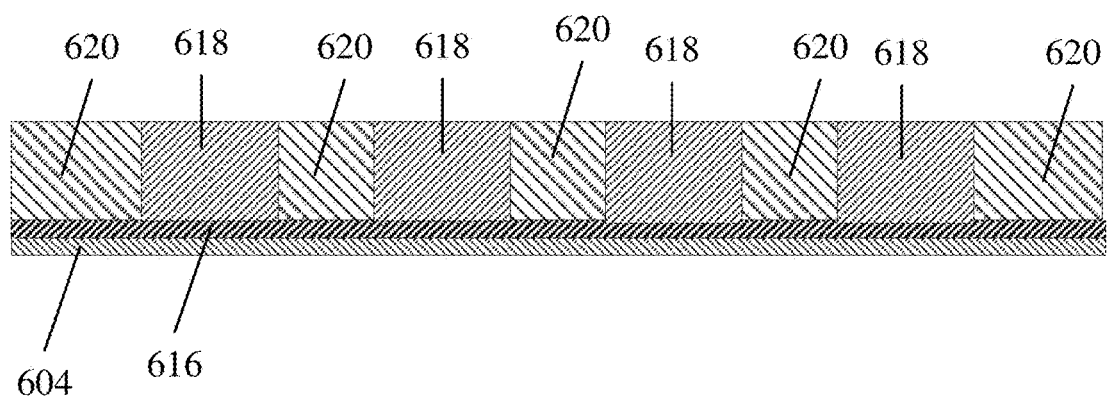
FIG. 10B depicts a partial cross-sectional view of the article of footwear of FIG. 9B.

The printed materials 616, 618, 620 can, in some embodiment, be formed from printed materials having different properties (e.g., color and/or hardness). For example, the first printed material can have a first color (e.g., white) and a first hardness (e.g., 70 A), the second material can have a second color (e.g., black) and a second hardness (e.g., 50 D), and the third printed material can have a third color (e.g., white) and a third hardness (e.g., 40 A). Since the third printed material 620 is the outermost printed material and is formed from a relatively soft material, it may tend to wear away during use. As wear occurs, the second printed material 618 becomes exposed such that the NIKE® logo is visible, as shown in FIGS. 9B and 10B.

Accordingly, configuration of the printed materials in this manner can, for example, allow the second printed material 618 to act as a wear indicator. Thus, in some embodiments, the printed materials can be configured to provide information to the user (e.g., that it is time for a new pair of shoes) when the second material 618 becomes exposed.

Additionally or alternatively, there can be multiple layers of the same hardness (e.g., 40 A), each having a different color. In this manner, the printed materials can be configured to inform the user of the degree of wear of the article. For example, the upper 604 can have four layers of printed material disposed thereon, each having a different color. When only the fourth layer is exposed, the article has had little or no wear. When the third layer becomes exposed, the upper 604 has had some wear. When the second layer becomes exposed, the upper 604 has had significant wear. When the first layer becomes exposed, the upper 604 has had extreme wear.

The printed materials can be additionally or alternative configured to inform the user of wear patterns formed on the article by the user. For example, when the second layer becomes exposed on one particular portion of the upper (e.g., the toe portion of the upper) but the third or fourth layers remain exposed on other portions of the upper (e.g., the side and/or heel portions of the upper), the user can be informed that they are using the article in a particular manner or have a certain tendency (e.g., dragging their toe during the activity). This information can, for example, help the user identify and/or correct technique, habits, etc. This information can also be used by a manufacturer to identify locations at which relatively more durable material should be applied.

Figure 11:
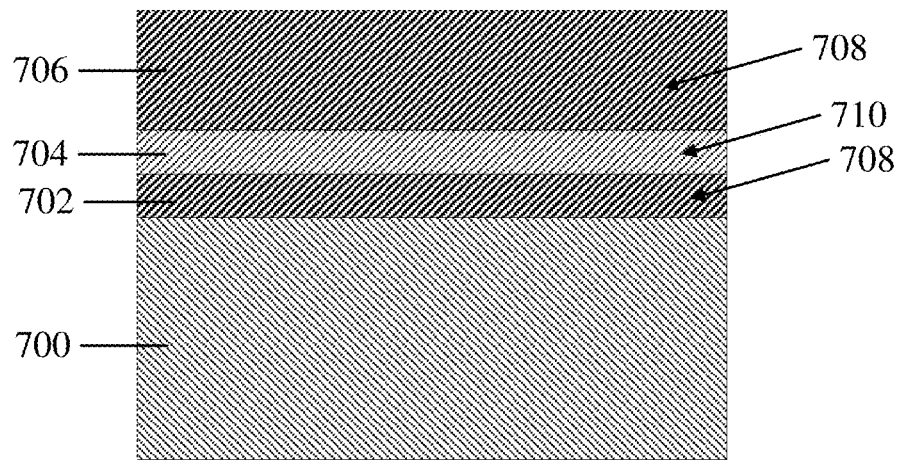
FIG. 11 depicts a partial cross-sectional view of the upper of another exemplary article of footwear.

FIG. 11 shows a portion of another exemplary article that comprises an upper 700 with printed material deposited thereon. The printed material can comprise one or more printed layers, which are formed by one or more printed materials. For example, in the illustrated embodiment, the upper 700 has a first printed layer 702, a second printed layer 704, and a third printed layer 706 deposited thereon. The first printed layer 702 is deposited directly on the upper 700. The second printed layer 704 is deposited directed on the first printed layer 702. The third printed layer 706 is deposited directly on the second printed layer 704.

The printed layers 702, 704, 706 can comprise one or more printed materials. In some embodiments, each of the printed layers can comprise a different printed material. In other embodiments, each of the printed layers can comprise the same printed material. In yet other embodiments, one or more of the printed layers can comprise the same printed material as one or more other layers and a different printed material than one or more other layers. For example, in the illustrated embodiment, the first and third printed layers 702, 706 comprise a first printed material 708, and the second printed layer 704 comprises a second printed material 710.

In some embodiments, the first printed material 708 of the first and third printed layers 702, 706 can be a relatively hard material (e.g., a material having a hardness of 70 A-100 A or 50 D-100 D). Forming the first printed layer 702 of a relatively hard material can, for example, help to ensure that there is good bonding between the first printed layer 702 and the upper 700, and thus reduce the likelihood that the first printed layer 702 will separate (e.g., "peel") from the upper 700. Forming the third printed layer 706 (e.g., the outermost layer) from a relatively hard material can, for example, provide relatively good abrasion resistance, and thus improve the longevity and/or appearance of the upper 700.

In some embodiments, the second printed material 710 of the second printed layer 704 can comprise a relatively soft material (e.g., a material having a hardness of 15 A-40 A). Forming the second printed material from a relatively soft material and positioning it between the relatively hard first and third printed layers 702, 706 can provide one or more advantages. For example, this allows the third printed layer 706 to articulate and/or flex relative to the first printed layer 702 and the upper 700. This in turn can reduce the likelihood that the printed layers will separate from the upper 700 and/or from each other when forces are applied to the printed layer, such as a shearing force that may occur as the toe portion of an article is scuffed against another object.

Thus, in some of the embodiments herein, various portions of articles include adjacent segments that collectively define a continuous portion of the article with different properties (e.g., different harness/stiffness). The size of the continuous portion can vary. For example, in some embodiments (e.g., FIGS. 1A & 1B), the continuous portion can cover at least the entirety of a toe portion. In other embodiments (e.g., FIG. 5), the continuous portion can extend from adjacent the sole structure to a superior edge of the upper (e.g., vertically across the height of the upper). In other embodiments (e.g., FIGS. 6A & 6B), the continuous portion can extend the entire length of the article from the heel portion to the toe portion (e.g., longitudinally across the length of the upper).

Figure 12:
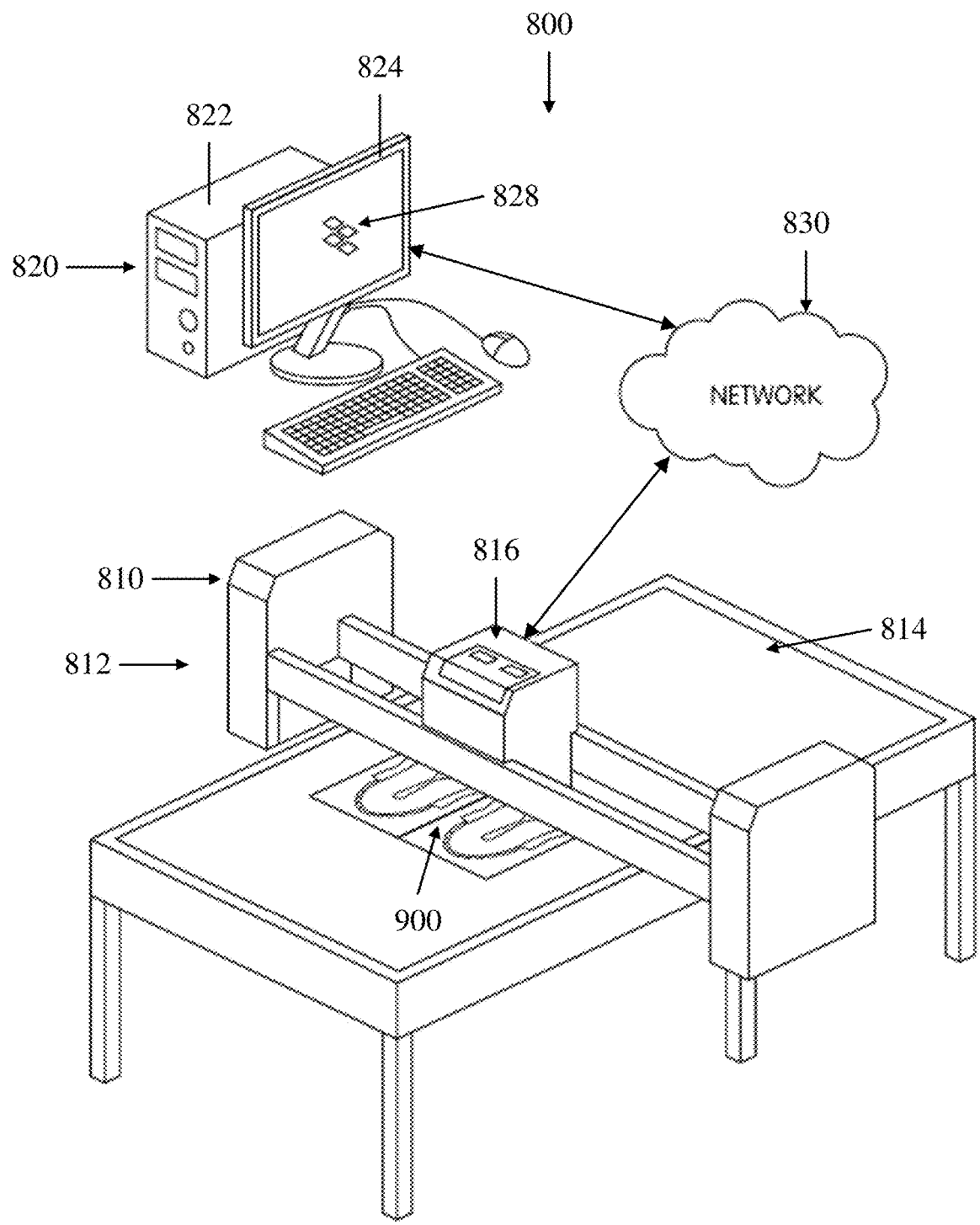
FIG. 12 depicts a schematic representation of an exemplary printing system that can be used to deposit printed materials onto articles of footwear.

FIG. 12 illustrates a schematic view of an exemplary embodiment of components of a printing system 800. In some embodiments, the printing system 800 may include several components for facilitating the printing of objects, for example, parts, elements, features, or structures on a base material or substrate 900, which in this exemplary embodiment forms an upper of an article of footwear.

In some embodiments, the printing system 800 includes a printing device 810, a computing system 820, and a network 830 connecting the printing device 810 and the computing system 820. Additional details of these components are provided below. For purposes of illustration, only some components of the printing system 800 are depicted in FIG. 12 and described below. It will be understood that in other embodiments, the printing system 800 may include additional components.

The printing system 800 may utilize various types of printing techniques. These can include, but are not limited to: toner-based printing, liquid inkjet printing, solid ink printing, dye-sublimation printing, inkless printing (including thermal printing and ultraviolet printing), MEMS jet printing technologies, as well as any other methods of printing. In some cases, the printing system 800 may make use of a combination of two or more different printing techniques. The type of printing technique used may vary according to factors including, but not limited to: material of the target article, size and/or geometry of the target article, desired properties of the printed image, such as durability, color, ink density, as well as printing speed, printing costs and maintenance requirements.

In some embodiments, the printing system 800 includes the printing device 810. In some embodiments, the printing device 810 may include features such as a housing component 812, a tray 814, and a printhead 816. The housing component 812 may be used to support other components, devices or systems of the printing system 800. In some embodiments, the housing component 812 may include features to move the substrate 900 during operation of the printing device 810. In some embodiments, the shape and size of the housing component 812 may vary according to factors that include the desired footprint for printing device 810, the size and shape of the substrate 900 or multiple substrates, the size and shape of features that may be formed on substrate 900, as well as possibly other factors.

In some embodiments, the printing device 810 may include provisions such as a table, platform, tray or similar component (e.g., the tray 814) to support, retain and/or hold the substrate 900. In some embodiments, the tray 814 may be used to position the substrate 900 while printed material is deposited onto the substrate 900 by a printhead 816. In some embodiments, the tray 814 may retain a single substrate 900. In some other embodiments, the tray 814 may be so dimensioned and sized such that it can retain one or more additional substrates as shown.

Some embodiments can include provisions to facilitate forming a selectively printed design feature on the substrate 900. For example, the printing device 810 may include provisions for depositing a layer material onto substrate 900, such as the printhead 816. The printing device can also include provisions for applying radiant energy, such as an ultraviolet lamp. In some embodiments, the printing device 810 includes a printhead and an ultraviolet lamp to transform a physical property of a layer material and form a selectively printed design feature on the substrate 900.

In some embodiments, the printhead 816 may be used to deposit an ink layer in order to form a selectively printed design feature onto the substrate 900. As used herein, "selectively printed design feature," and variants thereof, can refer to depositing a layer material onto portions of a surface at a chosen location on a base material element to define a user selected design, indicia, or marking at that chosen location, and where the finished result is a design, indicia, marking having a three-dimensional structure. The selectively printed design feature can also include both a singular marking and a plurality of markings. In some embodiments, the printhead 816 is configured to move and deposit an ink layer within housing component 812 in a horizontal direction or axis, for example, front-back and/or left-right with respect to housing component 812.

Some printing systems may include provisions to control and/or receive information from printing device 810. These provisions can include the computing system 820 and the network 830. As used in this detailed description and in the claims, the "computing system" and variants thereof may refer to the computing resources of a single computer, a portion of computing resources of a single computer, and/or two or more computers in communication with one another. Any of these resources can be operated by one or more human users. In some embodiments, the computing system 820 may include one or more servers. In some cases, a print server may be primarily responsible for controlling and/or communicating with the printing device 810, while one or more computers (e.g., desktop, laptop, tablet, smartphone, etc.) can facilitate interactions with a user. The computing system 820 can also include one or more storage devices including but not limited to magnetic, optical, magneto-optical storage devices, and/or memory, including volatile memory and non-volatile memory.

As shown in FIG. 12, the computing system 820 can include a central processing device 822, a visual display component 824 (e.g., a monitor or a screen), an input device (e.g., a keyboard and/or a mouse), and software comprising instructions for designing a computer-aided design ("CAD") representation 828 of a design feature. In at least some embodiments, the CAD representation 828 of a design feature may include not only information about the geometry of the structure, but also information related to the materials required to print various portions of the design feature.

In some embodiments, the computing system 820 can be in communication with the printing device 810 through the network 830. The network 830 can include any wired or wireless provisions that facilitate the exchange of information between the computing system 820 and the printing device 810. In some embodiments, the network 830 can further include various components such as network interface controllers, repeaters, hubs, bridges, switches, routers, modems, and/or firewalls. In some cases, the network 830 can be a wireless network that facilitates wireless communication between two or more systems, devices, and/or components of the printing system 800. Examples of wireless networks include, but are not limited to: wireless personal area networks (including, for example, Bluetooth), wireless local area networks (including networks utilizing the IEEE 802.11 WLAN standards), wireless mesh networks, mobile device networks, as well as other kinds of wireless networks. In other cases, the network 830 could be a wired network including networks whose signals are facilitated by twister pair wires, coaxial cables, and/or optical fibers. In still other cases, a combination of wired and wireless networks and/or connections could be used.

The printing device 810 can, for example, deposit layer materials in order to print objects such as a selectively printed design features directly onto one or more base material elements. The selectively printed designs can include one or more of the above-mentioned configurations of printed material as described with respect to FIGS. 1A-11.

Figure 13:
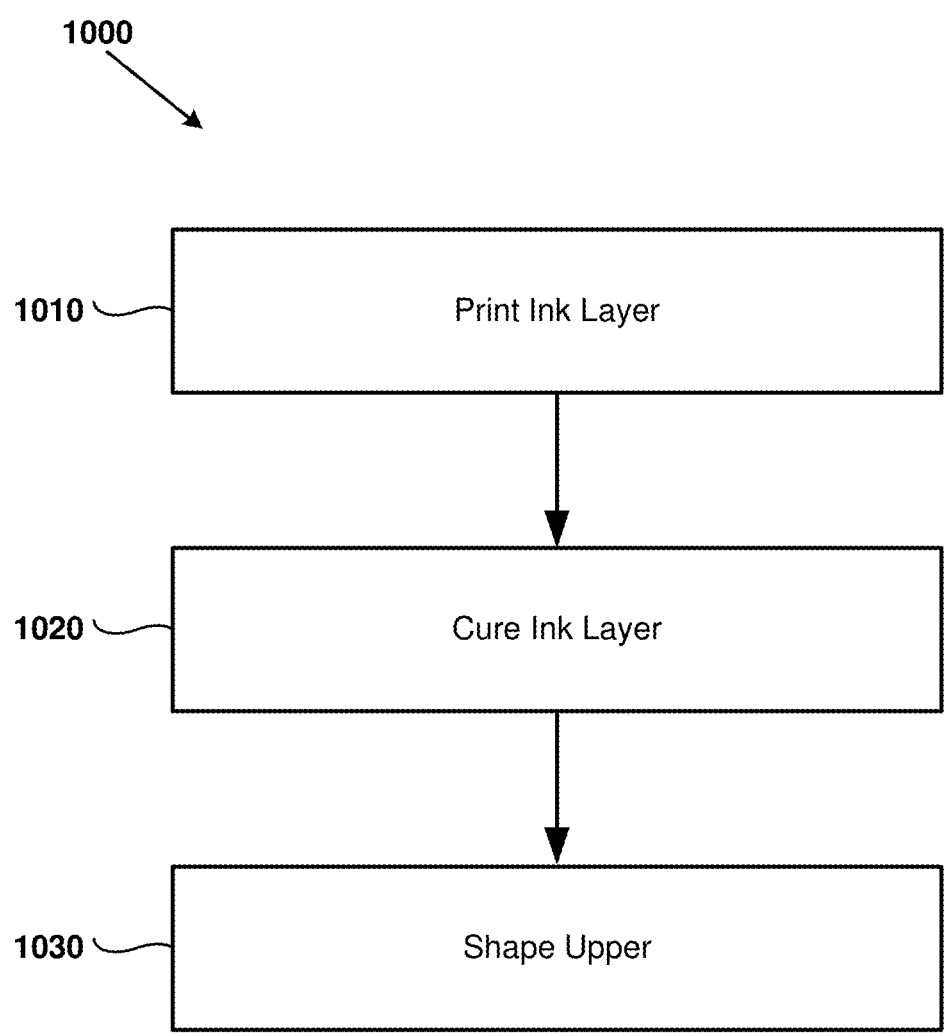
FIG. 13 depicts an exemplary method for printing onto an article of footwear.

In some embodiments, the printing device 810 can be used to print a three-dimensional structure onto a flat or planar substrate, and the flat substrate can be shaped into curved or non-planar object. For example, FIG. 13 depicts an exemplary method 1000 for printing which can be performed, for example, by the printing system 800. In some embodiments, some or all of the following steps may be performed by a control unit included within a printing system. In some other embodiments, some or all of these steps may be performed by additional systems or devices associated with a printing system, such as a printing device. In addition, where a printing device is in electronic communication with a computing system, one or more steps could be performed by a central processing device of the computing system. In addition, it will be understood that in other embodiments, one or more of the following steps may be optional, or additional steps may be added.

The method 1000 can include printing an ink layer onto an upper (process block 1010), curing the ink layer (process block 1020), and shaping the upper into a three-dimensional configuration (process block 1030). Printing the ink layer (process block 1010) can include depositing one or more ink layers in various patterns or configuration such as those described above with respect to FIGS. 1A-11.

Figure 14:
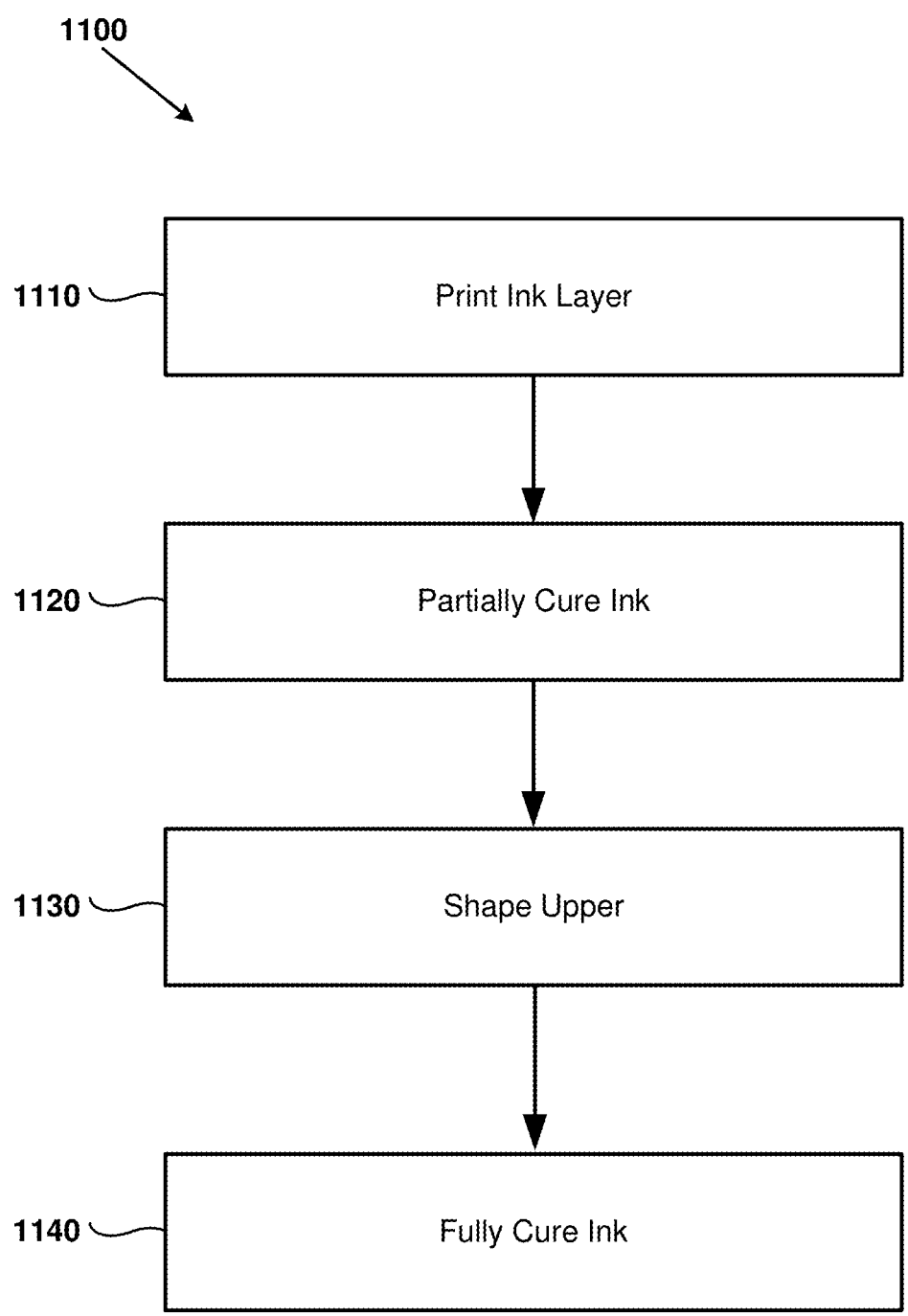
FIG. 14 depicts another exemplary method for printing onto an article of footwear.

FIG. 14 depicts another exemplary method 1100 for printing which can be performed, for example, by the printing system 800. The method 1100 can include printing an ink layer onto an upper (process block 1110), partially curing the ink layer (process block 1120), shaping the upper into a three-dimensional configuration (process block 1130), and fully curing the ink layer (process block 1140). Printing the ink layer (process block 1010) can include depositing one or more ink layers in various patterns or configuration such as those described above with respect to FIGS. 1A-11. Additional details regarding curing and partial curing can be found, for example, in U.S. Publication No. US 2017/0120514, which is incorporated by reference herein.

Figure 15:
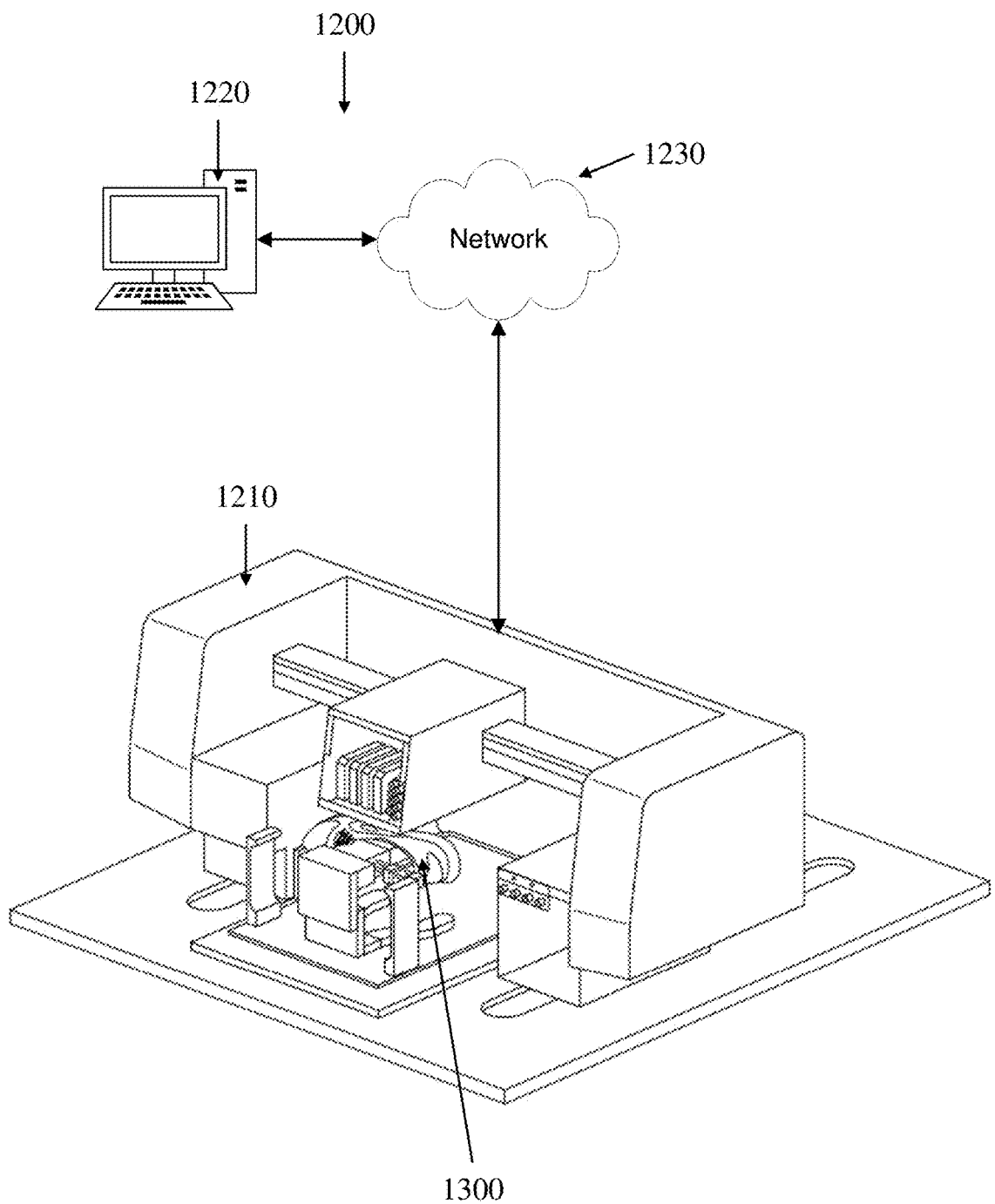
FIG. 15 depicts a schematic representation of another exemplary printing system that can be used to deposit printed materials onto articles of footwear.

FIG. 15 illustrates a schematic view of an exemplary embodiment of components of a printing system 1200. In some embodiments, the printing system 1200 may include several components for facilitating the printing of objects, for example, parts, elements, features, or structures on a three-dimensional substrate, which in this exemplary embodiment is the upper of an article of footwear 1300.

In some embodiments, the printing system 1200 includes a printing device 1210, a computing system 1220, and a network 1230 connecting the printing device 1210 and the computing system 1220. The components of the printing system 1200 can, generally speaking, be configured similar to the components of printing system 800, which are described above. For purposes of illustration, only some components of the printing system 1200 are depicted in FIG. 15 and described below. It will be understood that in other embodiments, the printing system 1200 may include additional components.

The printing device 1210 can, for example, deposit layer materials in order to print objects such as a selectively printed design feature directly onto one or more base material elements. The selectively printed designs can include one or more of the above-mentioned configurations of printed material as described above with respect to FIGS. 1A-11.

Figure 16:
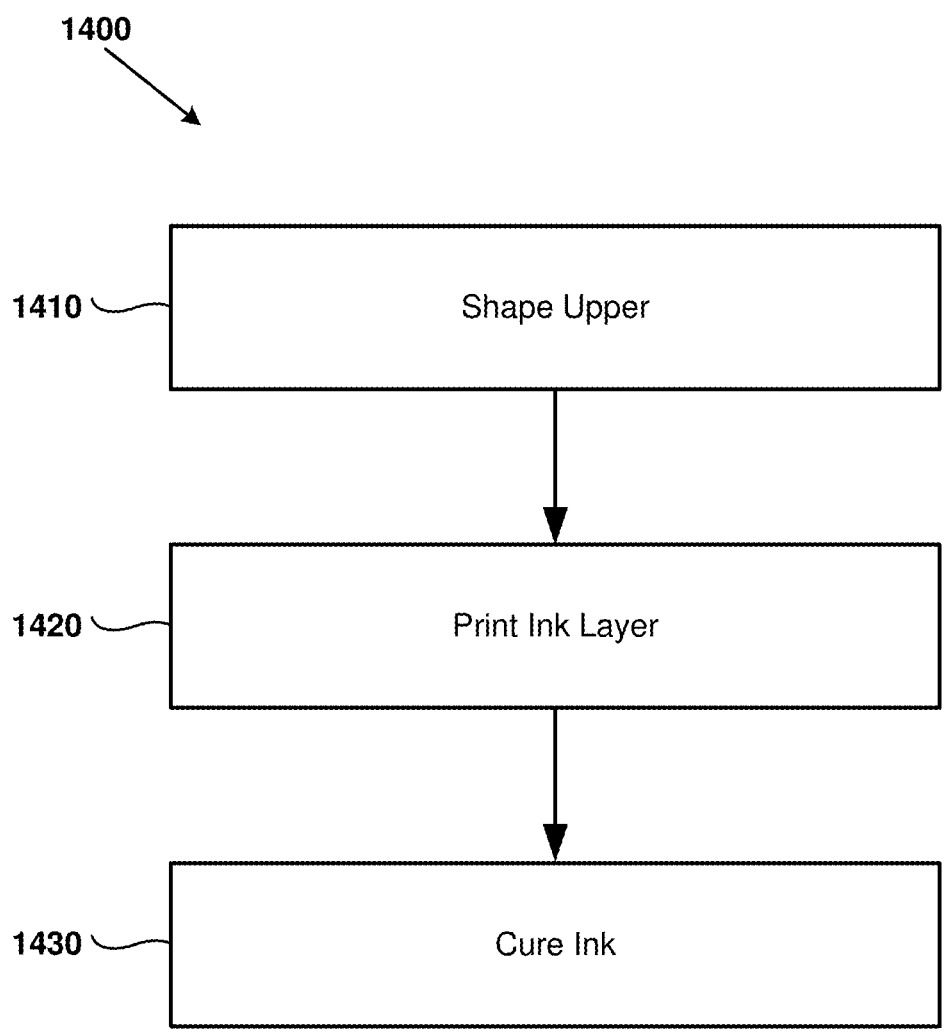
FIG. 16 depicts another exemplary method for printing onto an article of footwear.

In some embodiments, the printing device 1210 can be used to print a three-dimensional structure onto a curved or non-planar object such as the upper of the article 1300. For example, FIG. 16 depicts an exemplary method 1400 for printing which can be performed, for example, by the printing system 1200. In some embodiments, some or all of the following steps may be performed by a control unit included within a printing system. In some other embodiments, some or all of these steps may be performed by additional systems or devices associated with a printing system, such as a printing device. In addition, where a printing device is in electronic communication with a computing system, one or more steps could be performed by a central processing device of the computing system. In addition, it will be understood that in other embodiments, one or more of the following steps may be optional, or additional steps may be added.

Referring to FIG. 16, the method 1400 can include shaping the upper into a three-dimensional configuration (process block 1410), printing an ink layer onto an upper (process block 1420), and curing the ink layer (process block 1430). Printing the ink layer (process block 1420) can include depositing one or more ink layers in various patterns or configuration such as those described above with respect to FIGS. 1A-11.

In some embodiments, the printed material can be deposited directly onto the upper of the article by the printing device (e.g., the printing devices 810, 1210). Additional details regarding printing directly onto the upper of an article can be found, for example, in U.S. Pat. No. 8,993,061, which is incorporated by reference herein.

The printed material (e.g., the printed materials 120, 122, 210, 212, 316a-316d, and the other exemplary printed materials described herein) can be an ink, a resin, an acrylic, a polymer, a thermoplastic material, a thermosetting material, a light-curable material, or combinations thereof. The printed material can also include a filler material to impart a strengthening or aesthetic aspect to printed material in one or more layers. For example, the filler material incorporated in printed material may be a powdered material or dye designed to impart desired color or color patterns or transitions, metallic or plastic particles or shavings, or a powdered mineral, metal, or plastic. In some embodiments, the printed material can be a composite material.

The disclosed systems and methods advantageously can provide a single printing process that can be used to print aesthetic features and/or structural features on an article. As such, the disclosed technology can, for example, provide more efficient manufacturing compared to the typical systems and methods.

The disclosed technology can also provide exemplary systems and methods that enable aesthetic features to also function as structural features, and vice versa. Accordingly, the technology can, for example, provide design and/or performance options for articles that are significantly more customizable than those of typical systems and methods.

Thus, the disclosed technology provides increased customization for articles via the use of printed material. It also increases throughput by replacing multiple manufacturing processes (e.g., processing multiple types of uppers) with a single process (i.e., printing on an upper). In addition, consumption of raw materials is reduced because the number of inputs (e.g., various types of uppers) to achieve a desired range of customization (e.g., flexibility, color, etc.) is reduced by being able to print the custom feature on the upper rather than forming uppers from a different materials to provide customization.

The structural features described herein, with regard to any example, can be combined with other structural features described in any one or more of the other examples. For example, an article can have one or more of the features of the article 100 (e.g., printed material with alternating hardness) combined with one or more of the features of the article 400 (e.g., printed material with gradated hardness).

In view of the many possible embodiments to which the principles of the disclosure may be applied, it should be recognized that the illustrated embodiments are only preferred examples and should not be taken as limiting the scope of the claims. Rather, the scope of the claimed subject matter is defined by the following claims and their equivalents.

The invention claimed is:

1. An article of footwear, comprising:
   a sole structure;
   an upper coupled to the sole structure and comprising a toe portion;
   a first printed layer disposed on the toe portion of the upper, the first printed layer comprising a first printed material, and the first printed material having a first hardness; and
   a second printed layer disposed on the first printed layer, the second printed layer including:
     a second printed material having a plurality of spaced-apart first segments, wherein the second printed material has a second hardness, wherein the first segments extend longitudinally in a first direction; and
     a third printed material having a plurality of spaced-apart second segments, wherein the third printed material has a third hardness, wherein the third hardness of the third printed material is less than the second hardness of the second printed material, wherein the second segments extend longitudinally in the first direction, and wherein the first segments and the second segments are arranged in an alternating pattern in a second direction, wherein each of the plurality of spaced-apart second segments is disposed between a respective pair of segments of the plurality of spaced-apart first segments such that the upper can stretch to a greater extent in the second direction than in the first direction.

2. The article of footwear of claim 1, wherein the second printed material has a first appearance, and wherein the third printed material has a second appearance that is the same as the first appearance.

3. The article of footwear of claim 2, wherein the first and second appearances include a color and a texture of the respective second and third printed materials.

4. The article of footwear of claim 1, wherein the second printed material has a first thickness, and wherein the third printed material has a second thickness that is the same as the first thickness.

5. The article of footwear of claim 1, wherein each of the first segments and the second segments extends longitudinally from an anterior edge of the toe portion of the upper adjacent to the sole structure toward a heel portion of the upper.

6. The article of footwear of claim 1, wherein the first hardness and the second hardness are determined using a Shore durometer test.

7. The article of footwear of claim 6, wherein the first hardness is within a range of 50 A-100 A on a Shore A durometer scale, and the second hardness is within a range of 15 A-49 A on the Shore A durometer scale.

8. A method of printing onto an article of footwear, comprising:
   printing a first printed layer onto a toe portion of an upper of the article of footwear, wherein printing the first printed layer includes depositing a first printed material onto a first portion of the upper, and wherein the first printed material has a first hardness; and
   printing a second printed layer onto the first printed layer, wherein printing the second printed layer includes:
     depositing a second printed material onto the first portion of the first printed layer, wherein the second printed material has a second hardness and comprises a plurality of spaced-apart first segments, wherein the first segments extend longitudinally in a first direction; and
     depositing a third printed material onto a second portion of the first printed material, wherein the third printed material has a third hardness that is less than the second hardness of the second printed material and comprises a plurality of spaced-apart second segments, wherein the second segments extend longitudinally in the first direction, and wherein the first segments and the second segments are arranged in an alternating pattern in a second direction, wherein each of the plurality of spaced-apart second segments is disposed between a respective pair of segments of the plurality of spaced-apart first segments such that the upper can stretch to a greater extent in the second direction than in the first direction.

9. The method of claim 8, wherein the first and second printed layers are printed when the upper is in a flat configuration, and wherein the method further comprises partially curing the first and second printed layers while the upper is in the flat configuration.

10. The method of claim 9, wherein, after the first and second printed layers are partially cured, the method further comprises forming the upper into a curved configuration and fully curing the first and second printed layers.

11. The method of claim 8, wherein the first and second printed layers are printed while the upper is in a curved configuration.

12. An article of footwear, comprising:
    a sole structure;
    an upper coupled to the sole structure, wherein the upper comprises a toe portion;
    a first printed layer disposed on the toe portion of the upper, the first printed layer comprising a first printed material; and
    a second printed layer disposed on the first printed layer, the second printed layer including:
      a second printed material having a first plurality of spaced-apart segments, wherein the second printed material has a first hardness, wherein the first plurality of spaced-apart segments collectively covers a first width of the toe portion of the upper, wherein the first width is less than a total width of the toe portion, and wherein the total width of the toe portion is measured from a medial edge of the upper to a lateral edge of the upper at the widest part of the toe portion; and a third printed material having a second plurality of spaced-apart segments, wherein the third printed material has a second hardness that is less than the first hardness of the second printed material, wherein the second plurality of spaced-apart segments collectively covers a second width of the toe portion of the upper that is less than the first width of the toe portion, and wherein each of the second plurality of spaced-apart segments is disposed between a respective pair of segments of the first plurality of spaced-apart segments such that the first plurality of spaced-apart segments and the second plurality of spaced-apart segments form an alternating pattern in a medial/lateral direction such that the upper can stretch to a greater extent in the medial/lateral direction than in an anterior/posterior direction.

13. The article of footwear of claim 12, wherein the first width of the first plurality of spaced-apart segments is greater than a majority of the total width of the toe portion, and wherein the second width of the second plurality of spaced-apart segments is less than the majority of the total width of the toe portion.

14. The article of footwear of claim 12, wherein the second printed material has a first appearance, and wherein the third printed material has a second appearance that is the same as the first appearance.

15. The article of footwear of claim 14, wherein the first and second appearances include a color and a texture of the respective second and third printed materials.

16. The article of footwear of claim 12, wherein the second printed material has a first thickness, and wherein the third printed material has a second thickness that is the same as the first thickness.

17. The article of footwear of claim 12, wherein each of the first and second pluralities of spaced-apart segments extends longitudinally from an anterior edge of the toe portion of the upper toward a heel portion of the upper.

18. The article of footwear of claim 12, wherein the first hardness and the second hardness are determined using a Shore durometer test.

19. The article of footwear of claim 18, wherein the first hardness is within a range of 50 A-100 A on a Shore A durometer scale, and the second hardness is within a range of 15 A-49 A on the Shore A durometer scale.

* * * * *